US012496477B2

(12) United States Patent
Richardson

(10) Patent No.: US 12,496,477 B2
(45) Date of Patent: Dec. 16, 2025

(54) FIRE SUPPRESSING GAS GENERATORS, SYSTEMS, AND ARRANGEMENTS

(71) Applicant: Adam Tartar Richardson, Barrie (CA)

(72) Inventor: Adam Tartar Richardson, Barrie (CA)

( * ) Notice: Subject to any disclaimer, the term of this patent is extended or adjusted under 35 U.S.C. 154(b) by 299 days.

(21) Appl. No.: 18/230,497

(22) Filed: Aug. 4, 2023

(65) Prior Publication Data

US 2025/0041642 A1 Feb. 6, 2025

(51) Int. Cl.
*A62C 5/00* (2006.01)
*A62C 37/36* (2006.01)

(52) U.S. Cl.
CPC .............. *A62C 5/006* (2013.01); *A62C 37/04* (2013.01)

(58) Field of Classification Search
CPC ......... A62C 5/006; A62C 37/04; A62C 35/02; A62C 13/22; A62C 35/023; A62C 35/58
See application file for complete search history.

(56) References Cited

U.S. PATENT DOCUMENTS 6,123,359 A * 9/2000 Cabrera ................. B01D 39/10 149/36
6,513,602 B1 * 2/2003 Lewis .................... A62C 5/006 169/84
7,028,782 B2 4/2006 Richardson
7,784,556 B2 8/2010 Richardson et al.
8,413,732 B2 4/2013 Richardson et al.
8,939,225 B2 * 1/2015 Cox ....................... A62C 5/006 169/72
10,605,409 B2 * 3/2020 Veto ......................... B64D 1/16
2004/0089460 A1 5/2004 Richardson
2008/0135266 A1 6/2008 Richardson et al.
2010/0170684 A1 7/2010 Richardson et al.
2013/0180739 A1 7/2013 Richardson et al.

FOREIGN PATENT DOCUMENTS

WO 2019034911 A1 2/2019

* cited by examiner

*Primary Examiner* — Len Tran
(74) *Attorney, Agent, or Firm* — Dickinson Wright LLP; Matthew D. Powell

(57) ABSTRACT

A fire suppressing gas generator includes a housing structure having an inner housing component comprising an array of discharge ports distributed thereon, an outer housing component encapsulating the inner housing component and comprising an array of openings distributed thereon, and spacing structure extending between the inner housing component and the outer housing component to maintain the inner housing component and the outer housing component in a fixed spaced relationship. A fire suppression subsystem within the inner housing includes at least one column of stacked propellant grains each comprising a pressed mixture of sodium azide and iron oxide.

36 Claims, 11 Drawing Sheets

FIRE SUPPRESSING GAS GENERATORS, SYSTEMS, AND ARRANGEMENTS

FIELD OF THE INVENTION

The present disclosure relates generally to suppression of fires in normally occupied areas, and more particularly to a fire suppressing gas generators, systems, and arrangements.

BACKGROUND OF THE INVENTION

For regulatory approval, in most countries, devices for fire suppression using inert gas generators are required to be below a certain surface temperature once the gas generator is actuated. Devices which activate a sodium azide and iron oxide mixed pressed grain to generate nitrogen gas, tend to create substantial surface heat, but only after discharge and until the gas generator body (inner housing component) cools to ambient temperature. In most cases, such devices are enclosed especially for transportation. There is a need for a fire suppressing gas generator that meets health and safety standards, especially for transportation, but that does not impede the expulsion of fire suppressing gas, does not have or impart substantial thrust bias, and that has an exterior surface that can be maintained within regulated temperatures.

There is also a need for fire suppressing gas generator systems and arrangements that are useful for retaining and/or actuating multiple gas generators.

SUMMARY OF THE INVENTION

In accordance with an aspect, there is provided a fire suppressing gas generator comprising: a housing structure comprising: an inner housing component comprising an array of discharge ports distributed thereon; an outer housing component encapsulating the inner housing component and comprising an array of openings distributed thereon; and spacing structure extending between the inner housing component and the outer housing component to maintain the inner housing component and the outer housing component in a fixed spaced relationship; and a fire suppression subsystem comprising: a filter disposed within the inner housing component and spaced from an interior wall of the inner housing component; a plurality of propellant grains inside the filter, the plurality of propellant grains comprising at least one column of stacked propellant grains, each of the propellant grains comprising a pressed mixture of sodium azide and iron oxide; and at least one ignition device associated with the propellant grains, wherein the propellant grains when ignited by the ignition device generate a fire suppressing gas which passes through the filter and out of the discharge ports of the inner housing component; wherein the distributions of the discharge ports of the inner housing component and the openings of the outer housing component provide substantial thrust neutrality to the fire suppressing gas generator when the fire suppressing gas passes out of the housing structure.

In accordance with another aspect, there is provided a fire suppression system comprising: a fire suppression portion comprising a plurality of the fire suppressing gas generators; and an actuation portion causing staged actuation of the plurality of the fire suppressing gas generators.

In accordance with another aspect, there is provided a fire suppression arrangement comprising: a fire suppressing gas generator; and a frame physically retaining the fire suppressing gas generator.

In accordance with another aspect, there is provided a fire suppression system comprising: a stack of multiple of the fire suppression arrangements.

In accordance with another aspect, there is also provided a fire suppressing gas generator comprising: a housing structure comprising an inner housing component having an array of discharge ports distributed thereon; a fire suppression subsystem hermetically sealed within the inner housing component and comprising: a filter disposed within the inner housing component and spaced from an interior wall of the inner housing component; a plurality of propellant grains inside the filter, the plurality of propellant grains comprising at least one column of stacked propellant grains, each of the propellant grains comprising a pressed mixture of sodium azide and iron oxide; and at least one ignition device associated with the propellant grains, wherein the propellant grains when ignited by the ignition device generate a fire suppressing gas which passes through the filter and out of the discharge ports of the inner housing component; and at least one inert test gas sealed within the inner housing component; and at least one normally closed valve extending from an exterior of the inner housing component to the interior of the inner housing component for, when caused to be opened, extracting a quantum of the inert test gas thereby to confirm the hermetic sealing of the fire suppression subsystem.

In accordance with another aspect, there is also provided a fire suppressing gas generator comprising: a housing structure comprising a cylindrical inner housing component having an array of discharge ports distributed thereon; a fire suppression subsystem within the cylindrical inner housing component and comprising: a cylindrical filter disposed within the inner housing component and spaced from an interior wall of the cylindrical inner housing component; a plurality of propellant grains inside the filter, the plurality of propellant grains comprising at least one column of stacked propellant grains, each of the propellant grains comprising a pressed mixture of sodium azide and iron oxide; and at least one ignition device associated with the propellant grains, wherein the propellant grains when ignited by the ignition device generate a fire suppressing gas which passes through the filter and out of the discharge ports of the cylindrical inner housing component; a ring at each of opposite ends of the cylindrical inner housing component for centering respective ends of the cylindrical filter within the cylindrical inner housing component; an end cap connectable to each of opposite ends of the cylindrical inner housing component for retaining the fire suppression subsystem within the cylindrical inner housing component; and a gasket within a respective ring at each of the opposite ends of the cylindrical inner housing component and between a respective end cap and the cylindrical filter, wherein prior to connecting of the end caps and the cylindrical inner housing component each gasket extends beyond the respective ring and is compressible between the respective end cap and the cylindrical filter.

Various examples are described.

BRIEF DESCRIPTION OF THE FIGURES

Examples will now be described more fully with reference to the accompany drawings, in which.

DETAILED DESCRIPTION OF THE EXAMPLES

Figure 1:
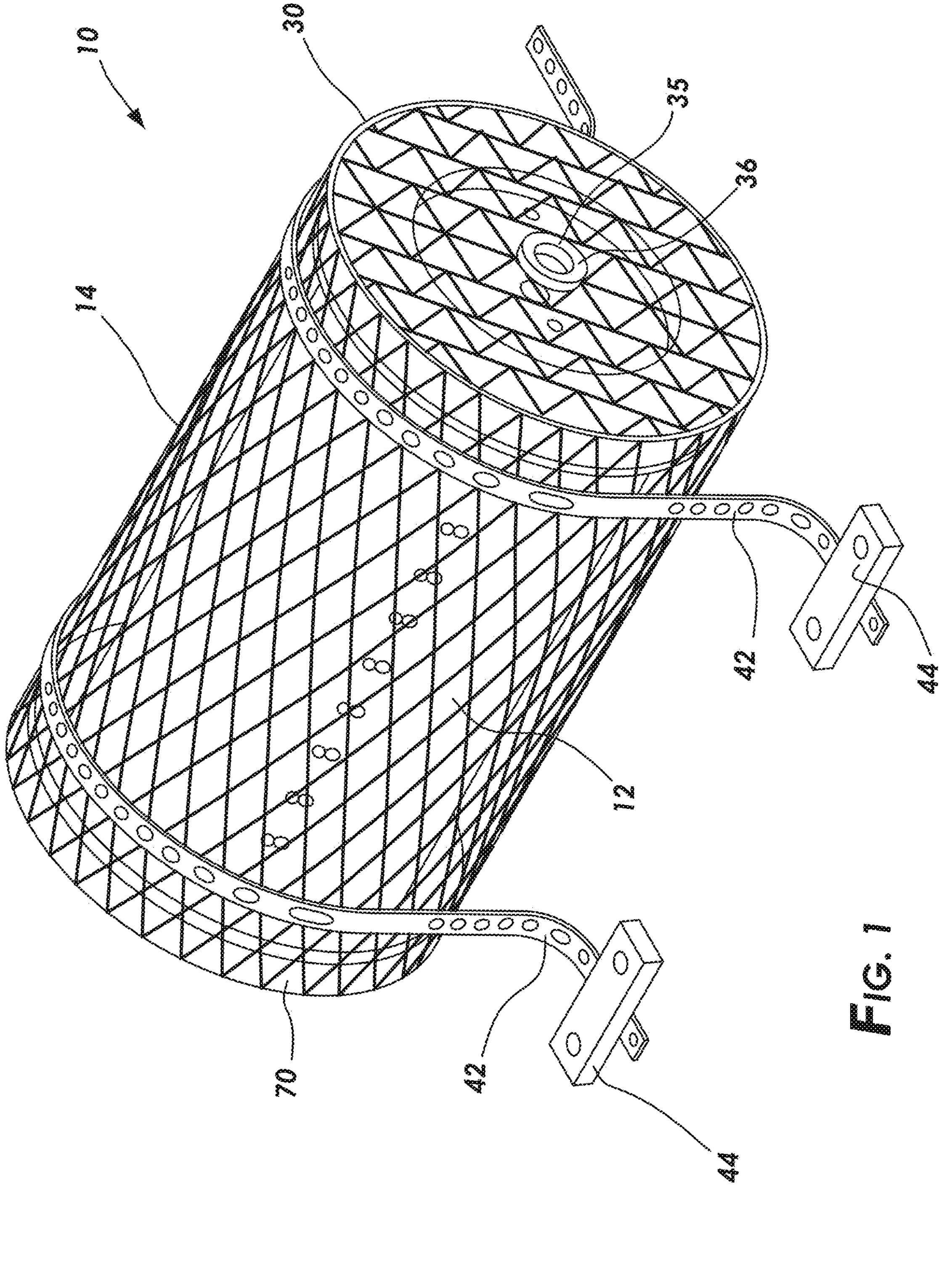
FIG. 1 is a perspective view of a fire suppressing gas generator, according to an example.

FIG. 1 is a perspective view of a fire suppressing gas generator 10, according to an example. In this example, generator 10 includes a housing structure including an inner housing component 12 and an outer housing component 14. In this example, each of inner housing component 12 and outer housing component 14 is formed of steel. Inner housing component 12 and outer housing component 14 are maintained in a fixed spaced relationship with one another by a nonconductive spacing structure that includes a rigid first end ring 30 and a rigid second end ring 70. When inner housing component 12 is encapsulated within outer housing component 14, an annular space is maintained by the spacing structure between inner housing component 12 and outer housing component 14.

In a first end of the outer housing component 14 is a centrally-positioned hole 35, the edge of which accommodates and supports a washer 36. Hole 35 and washer 36 are sized to enable electrical access to an initiator assembly (not shown in FIG. 1) of generator 10). In this example, steel straps 42 may be used in conjunction with brackets 44 and fasteners (such as screws; not shown) to retain generator 10) against a surface, such as against a floor of a vehicle or a container within the vehicle, such as an AAY container, during transportation.

Figure 2:
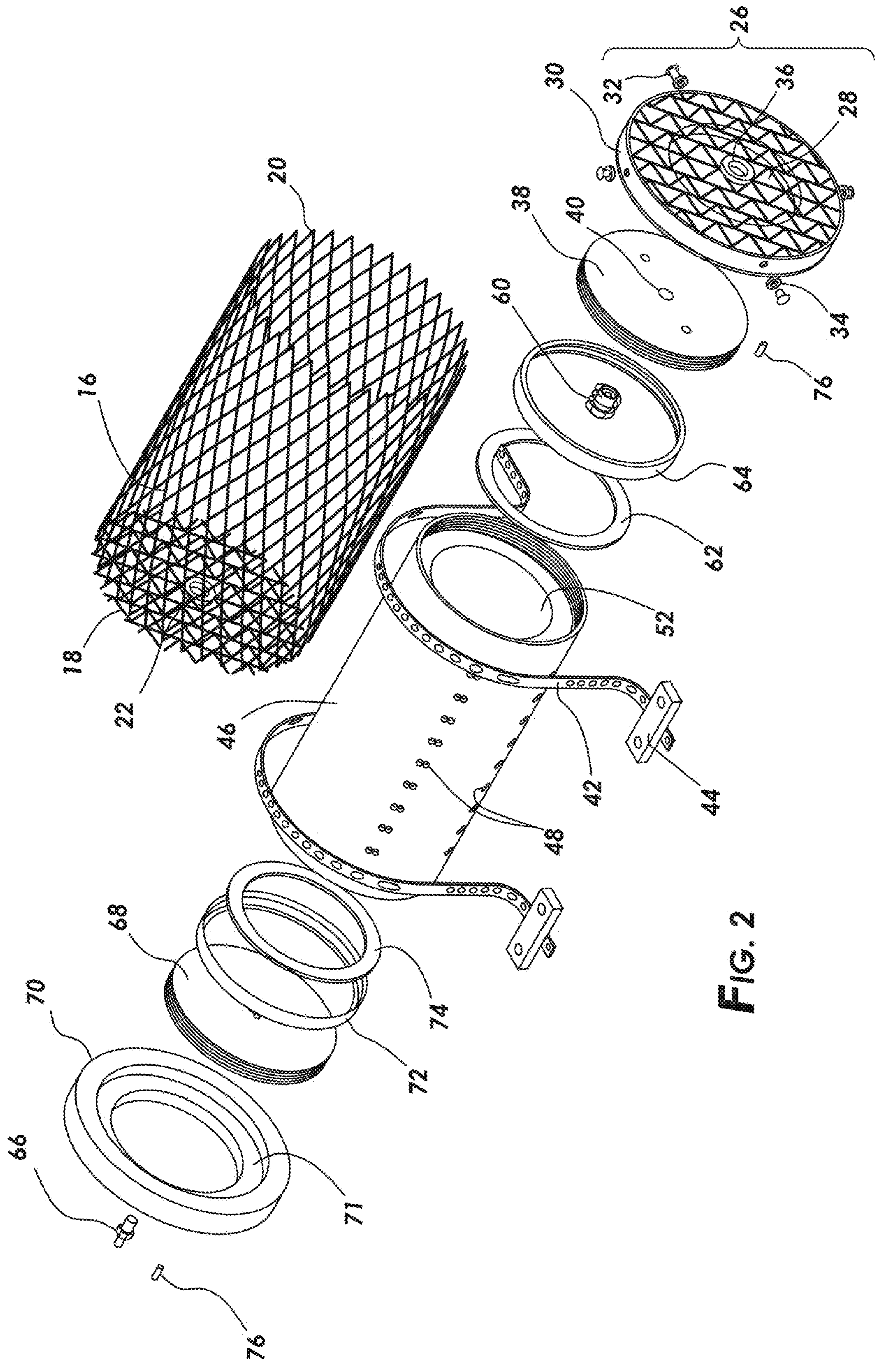
FIG. 2 is an exploded view of portions of the fire suppressing gas generator of FIG. 1.

FIG. 2 is an exploded view of components of generator 10. Outer housing component 14 includes an array of openings 18 distributed on its surface and extending from its exterior to its interior where inner housing component 12 is being encapsulated. In this example, outer housing component 14 is a multi-piece cylindrical cage or mesh body, with its openings manifesting as spaces between bars of the cage/mesh. In this example, the multi-piece mesh includes a cylindrical cup portion 16 itself having a cylindrical shape with an open first end and a closed second end.

In the second end of the outer housing component 14 is a centrally-positioned hole, the edge of which accommodates and supports a washer 22. This hole and washer 22 are sized to enable physical access to a valve 66 that is supported within an end cap 68 of inner housing component 12 and extends out of the interior inner housing component 12 to an exterior of inner housing component 12 when generator 10) is assembled. Valve 66 is normally closed. Access to valve 66 enables one or more inert test gas such as Helium to be injected through valve 66 when temporarily opened into an otherwise hermetic sealed gas-tight assembled inner housing component 12. Insertion of an inert test gas to be retained within inner housing component 12 creates a small positive pressure within the sealed inner housing component 12 that serves to inhibit ingress of ambient air/moisture, and allows for subsequent periodic checks of the hermetic seal integrity of inner housing component 12 to be conducted. For example, at defined intervals, a small quantum of the previously-inserted inert test gas (for clarity, the test gas is not inserted in sufficient quantities to itself serve as an effective fire suppressing gas, but just as a seal integrity "indicator") may be drawn via valve 66 out of inner housing component 12 to confirm its manufactured hermetic seal is maintained, by this inert test gas being retained and thus having not since leaked out of inner housing component 12 to be replaced with ambient air and moisture. In the event that, during a particular check, the particular inert test gas is detected, the gas-tight hermetic seal integrity of inner housing component 12 can be confirmed. If the particular inert test gas is not detected, then it may be decided that the inner housing component 12 has lost integrity such that the reliability of the rest of the components housed within inner housing component 12 to generate a fire suppressing gas (i.e., the propellant grains; the initiator grain; etc.) cannot be confirmed. This may lead to replacement or refurbishment of the generator 10), in accordance with appropriate rules and regulations. One or multiple such valves may be provided in a given fire suppressing gas generator.

In this example, valve 66 is a Schrader valve. In other examples, a valve of a different type could be deployed, such as a Presto valve.

Inner housing component 12 may be inserted into outer housing component 14 via the open second end, as will be described. The multi-piece mesh also has a cap 28, itself including bars and supported on first end ring 30 of the spacing structure so as to together form a closure 26. Screws 32 and 34 enable fastening of closure 26 against the outside of sleeve 46.

The generally-uniform distribution of the openings 18 on outer housing component 14 facilitates negligible thrust bias to outer housing component 14 when a fire suppressing gas passes out of openings 18. For example, thrust from a given quantum of gas exiting from one of the openings 18 and that would tend to propel outer housing component 14 in a particular direction is generally counteracted by thrust from another quantum of gas exiting another one of the openings 18 that is opposite outer housing component 14 from the one opening 18. In order to reduce the chance that a person or an object may come into contact with inner housing component 12 while fire suppressing gas is being generated, openings 18 may be sized smaller than, for example, the typical human finger, while being of sufficient size to enable the egress of fire suppression gas from within outer housing component 14 without undue internal pressure after ignition, and in a thrust neutral manner.

In this example, inner housing component 12 includes an open-ended cylindrical sleeve 46 that is formed of steel, and which includes arrays of discharge ports 48 distributed across its surface and each extending from its exterior to its interior. In this example, the discharge ports are arranged in multiple rows. The distribution of discharge ports 48 provides substantial thrust neutrality (i.e. facilitates negligible thrust bias) to the inner housing component 12 when a fire suppressing gas passes out of the discharge ports 48. In particular, discharge ports 48 are positioned on sleeve 46 in locations such that as fire suppressing gas is exiting from discharge ports 48 under pressure, inner housing component 12 does not tend substantially to be physically propelled in any particular direction. For example, thrust from a given quantum of gas exiting from one of the discharge ports 48 that would tend to propel inner housing component 12 in a particular direction tends to be counteracted by thrust from another quantum of gas exiting another one of the discharge ports 48 that is opposite inner housing component 12 from the one discharge port 48. Multiple discharge ports 48 are provided, and are sized, positioned and of a sufficient number to enable the egress of fire suppression gas from within inner housing component 12 without undue internal pressure after ignition, and in a thrust neutral manner.

End cap 68 has, at its periphery, threads which match the inside diameter threads of sleeve 46, and when screwed together, end cap 68 comes into contact with the top of a filter-pad-centering-ring 72. Filter-pad centering-ring 72 provides the benefit of maintaining the plenum spacing (discussed in further detail below) at its end of a filter pad 52 after assembly, as well as disciplining the positioning of a gasket 74 to be inserted between an end of filter pad 52 and end cap 68. Gasket 74 is thicker than the height of filter-pad-centering-ring 72 in that it extends beyond filter-pad centering-ring 72 when sitting atop of an end of a filter-pad 52 inserted within sleeve 46. As such, when the surface of end cap 68 presses down against gasket 74 a good seal is created against the internal propellant grain to block by-product (gas; particulate) from bypassing filter-pad 52 during actuation. In this example, gasket 74 is a silicone gasket, placed inside filter-pad-centering-ring 72, inserted atop respective end filter-pad 52 and sleeve 46 to retain components within sleeve 46. Similarly, an end cap 38 has, at its periphery, threads that match inside diameter threads of sleeve 46 and when screwed together, end cap 38 comes into contact with the top of a filter-pad-centering-ring 64. Filter-pad centering-ring 64 provides the benefit of maintaining the plenum spacing at its end of filter pad 52 after assembly, as well as disciplining the positioning of a gasket 62 to be inserted between the respective end of filter pad 52 and end cap 38. Gasket 62 is thicker than the height of filter-pad-centering-ring 64 in that it extends beyond filter-pad centering-ring 64. As such, when the surface of end cap 38 presses down against gasket 62 a good seal is created against internal propellant grain to block by-product (gas: particulate) from bypassing filter-pad 52 during actuation. In this example, gasket 62 is a silicone gasket, placed inside filter-pad-centering-ring 64, inserted atop respective end filter-pad 52 and sleeve 46 to retain components within sleeve 46. End cap 38 has a centrally-positioned bore 40) enabling electrical access to initiator assembly 60 which, as will be described, interfaces with propellant grains and can ignite the propellant grains within filter-pad inner housing component 12 when sufficient electrical power is applied to initiator assembly 60. Initiator assembly 60 may be a squib.

As explained briefly above, spacing structure extends between inner housing component 12 and outer housing component 14 to maintain inner housing component 12 and outer housing component 14 in a fixed spaced relationship. It is preferable that when inner housing component 12 is encapsulated within outer housing component 14, external objects—whether inanimate or animate—are not generally able to easily come into contact with inner housing component 12, as inner housing component 12 will tend to become quite hot when fire suppression is being generated inside of it. The spacing structure serves primarily to physically and thermally separate outer housing structure 14 from inner housing structure 12 so that heat imparted to inner housing structure 12 during generation of fire suppressing gas is not substantially transferred to outer housing structure 14. It will be appreciated that some of the heat carried by the fire suppressing gas itself may indeed be imparted to outer housing component 14 as the fire suppressing gas passes through openings 18, but this is expected to be a far lower amount of heat than would be borne by inner housing component 12. Furthermore, due to the size of openings 18 relative to the size of the bars of the cage, heat transferred to outer housing component 14 from fire suppressing gas can, in turn, be transferred to the ambient very quickly and efficiently after the rapid passage of the fire suppressing gas.

During assembly of fire suppressing gas generator 10, second end ring 70 of the spacing structure may be placed inside cylindrical cup portion 16 of the multi-piece cage prior to insertion of inner housing component 12 and against the inward-facing portion of its closed first end. Second end ring 70 is dimensioned to correspond in shape and size to the cylindrical shape of outer housing component 14, and in its inward-facing surface (opposite its outward-facing surface) has an annular shelf 71 forming an annular region spaced inwardly from its periphery for receiving and supporting a respective end of inner housing component 12. The amount that annular shelf 71 is spaced inwardly from its periphery corresponds to the fixed spaced relationship between inner housing component 12 and outer housing component 14.

Similarly, first end ring 30 of the spacing structure is also dimensioned to correspond in shape and size to the cylindrical shape of outer housing component 14. During assembly of fire suppressing gas generator 10), first end ring 30 may be placed atop a respective end of inner housing component 12 after inner housing component 12 has been inserted into outer housing component 14 and received by second end ring 70. First end ring 30 is at least partially inserted into the interior of outer housing component 14 until it rests against a respective end of inner housing component 12. More particularly, like second end ring 70, on its inward-facing surface (opposite its outward-facing surface), first end ring 30) of the spacing structure also has an annular shelf (not shown) forming an annular region spaced inwardly from its periphery for receiving and supporting the respective end of inner housing component 12. Similarly, the amount that the annular shelf of first end ring 30 is spaced inwardly from its periphery corresponds to the fixed spaced relationship between inner housing component 12 and outer housing component 14.

Each of first end ring 30 and second end ring 70 is formed of a material that is a poor heat conductor, but that can also maintain its physical rigidity even when exposed to pressure and heat from fire suppressing gas. In this example, the components of first end ring 30 and second end ring 70 that contact inner housing component 12 are formed of wood, pre-coated with a fire retardant paint. Other materials for rings 30, 70 could be used that provide sufficient structural rigidity while also resisting buckling/melting/combustion before, during, or after fire suppression. With wood in particular, wood combustion and even charring requires oxygen which will not substantially be present after ignition due to the primarily nitrogen content being forced into the region on combustion of the propellant grains. Furthermore, generally wood tends to combust at around 750 F (Fahrenheit), whereas during tests it has been found that the inner housing components such as those described herein reach only about 500 F after discharge such that wood in the vicinity would, at most, slightly char and would not combust. Again, other material options for rings 30 and 70, and for other embodiments of spacing structures, may be chosen.

Figure 3:
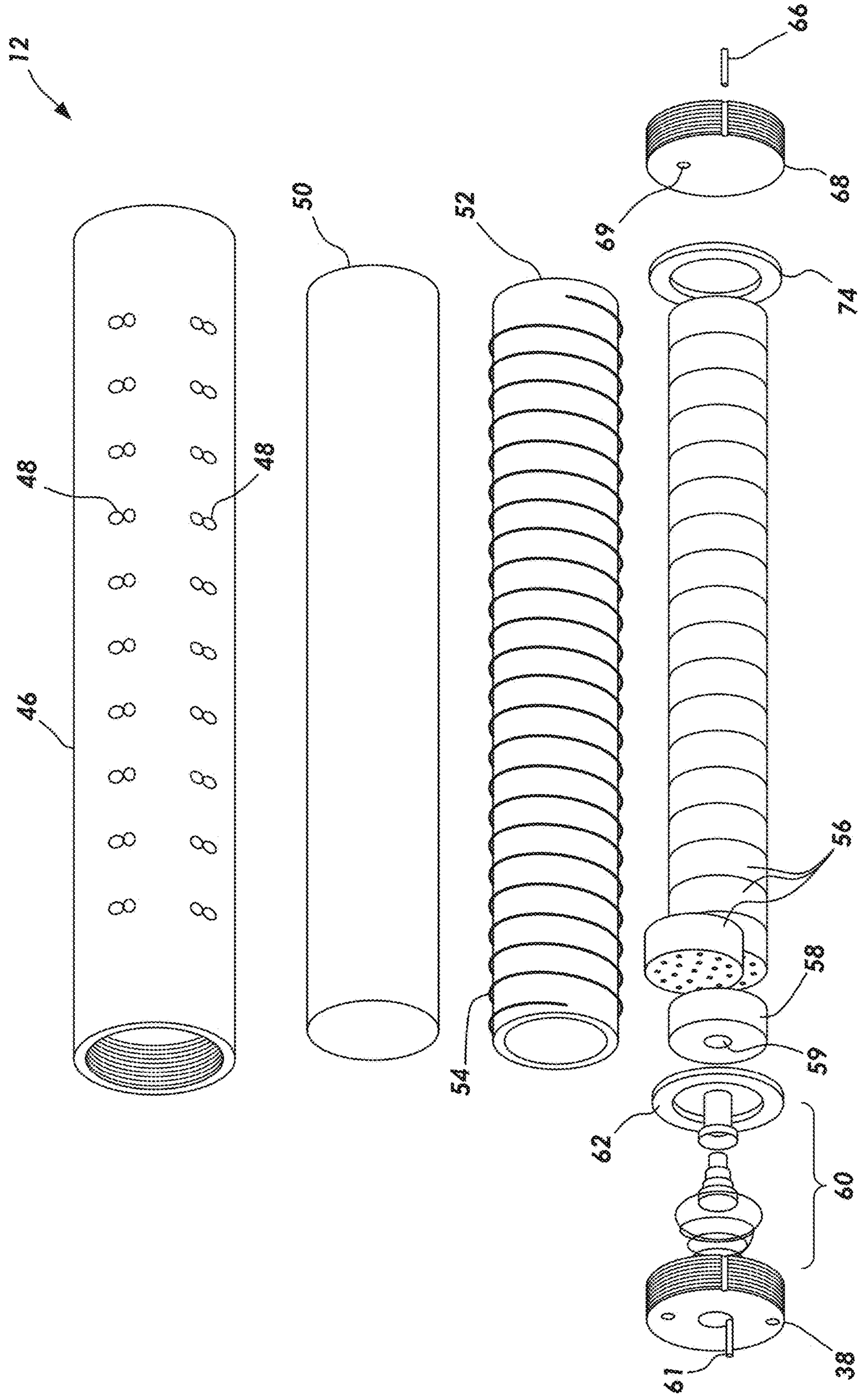
FIG. 3 is an exploded view of an inner housing component of the fire suppressing gas generator FIG. 1, but does not show filter-pad-centering-rings of FIG. 2.

FIG. 3 is an exploded view of the inner housing component 12 of the fire suppressing gas generator 10. The following will be described in conjunction with FIG. 2 and FIG. 3. It will be noted that not shown in FIG. 3 are the filter-pad centering-rings 72, 64 that are shown in FIG. 2. In this example, a fire suppression subsystem of fire suppressing gas generator 10) is encapsulated inside of a diffusing sleeve 46 of inner housing component 12, and includes a pierceable hollow cylindrical foil layer 50 lining the interior of diffusing sleeve 46. Foil layer 50 serves in conjunction with the gasket scaling described herein to block the flow inwards of air and moisture into the interior of diffusing sleeve past the foil layer 50, and to block the flow outwards of an inert gas out of the interior, thereby to help seal the interior. As will be described, the ingress of air/moisture may damage the propellant grains, rendering them less able or unable to be ignited to generate fire suppressing gas. Inserted into the interior of cylindrical foil layer 50—or otherwise "wrapped" by foil layer 50—is a filter, in this example a filter pad 52, itself wrapped with a coil of wire 54. The coil of wire 54 is provided to retain filter pad 52 in cylindrical form, but also to form a plenum space, thereby to space filter pad 52 from the interior wall of foil layer 50 and accordingly from the interior wall of diffusing sleeve 46. Filter pad 52 may be a fine screen mesh of steel wool and ceramic material layers rolled together to form a cylinder around another, coarser, mesh screen layer.

In turn, filter pad 52 surrounds a plurality of propellant grains 56. Each propellant grain 56, in this example, is a disk/puck shaped grain and is stacked against others in a cylindrical format. In this example, there is a single stack of propellant grains 56. Furthermore, in this example, each propellant grain 56 is a pressed mixture of sodium azide and iron oxide. For its part, filter pad 52 functions to inhibit escape of particulates from the interior of inner housing component 12 when grains 56 are ignited, and also to absorb some of the heat generated upon ignition of the grains 56. In this example, propellant grains 56 each include a number of small bores therethrough for providing greater overall surface area of the grains 56 and thus greater overall exposure to oxidation of the sodium azide and iron oxide of which they are made, facilitating faster ignition. It will be appreciated that, in other examples, propellant grains may not have any of these smaller bores or "pin holes", in which case, all other things being equal, the propellant grains would not ignite as quickly due to having less initial exposed surface area. Therefore, in general it will be appreciated that overall timing of gas production and its duration can be at least partially controlled through the grain production process, in particular by producing grains that have a higher or lower exposed surface area. This may be done using different overall shape envelopes or through the provision of the smaller bores. It will also be appreciated that some grains in a given fire suppressing gas generator may have such bores, and others may not, or still others may have slightly larger bores and/or different overall shape envelopes, in order to provide the manufacturer with control over the speed and duration of production of fire suppressing gas upon ignition. It will be appreciated, however, that generally puck-shaped grains are straightforward to make and to stack, do not have sharp edges that can easily break off of the whole during assembly, transportation, and installation, and can be made to provide a useful surface area to volume combination.

An end grain 58, which may also be a pressed mixture of sodium azide and iron oxide, has a central bore 59 dimensioned to receive a portion of an initiator assembly 60. Initiator assembly 60 itself serves as an ignition device that sparks when sufficient electrical current is imparted via a wire 61 and thereby ignites the end grain 58 with which it is associated thereby to set off a chain reaction of ignition of the propellant grains 56 in the cylindrical stack. Ignition of the pressed sodium azide and iron oxide in the propellant grains 56 causes a very rapid chemical reaction resulting in the release of a fire suppressing gas.

Also shown in FIG. 3, provided in end cap 68 facing propellant grains 56 is a powder pocket 69. Powder pocket 69 is sized and positioned to receive a quantum of black combustible powder, such as gunpowder. Such combustible powder can be retained within powder pocket 69 with at least one seal (not shown) applied during assembly. It is the case that, under normal intended controlled use, propellant grains 56 are to be ignited when initiator assembly 60 receives sufficient electrical power. However, certain regulations may require that certain ones of a set of fire suppressing gas generators 10) be spot-checked by being subjected to a "bonfire"-type test. A bonfire-type test is conducted to confirm at least that fire suppressing gas generator 10 would not explode in the event it is directly exposed to fire. Should fire suppressing gas generator 10) be placed into a bonfire for the sake of the bonfire-type test, the at least one seal over powder pocket 69 melts/combusts under the heat, exposing the combustible powder within powder pocket 69 to the bonfire. Under exposure to the heat/fire, the combustible powder will ignite and, due to its adjacency to the propellant grains 56, will cause propellant grains 56 to themselves ignite thereby to generate the fire suppressing gas. In this way, fire suppressing gas generator 10) may be subjected to the bonfire test so as to cause ignition of the propellant grains 56 without requiring that electrical power be conveyed to the initiator assembly 60. Therefore, in a sense, gas generation by fire suppressing gas generator 10) can be actuated in two ways: through electrical ignition as intended for normal controlled use, and through direct exposure to fire as might happen during transportation before installation in a given dwelling should the vehicle be in a collision and catch on fire. It will be appreciated that the second of these is not the normal or preferred mode of ignition, because it is typically not the case that, once installed and ready for use, any fire suppressing gas generator 10) would be directly exposed to fire before actuation of ignition assembly 60 was made to happen. That is, the second of these is chiefly for the sake of enabling the bonfire-type tests to be conducted.

Figure 4:
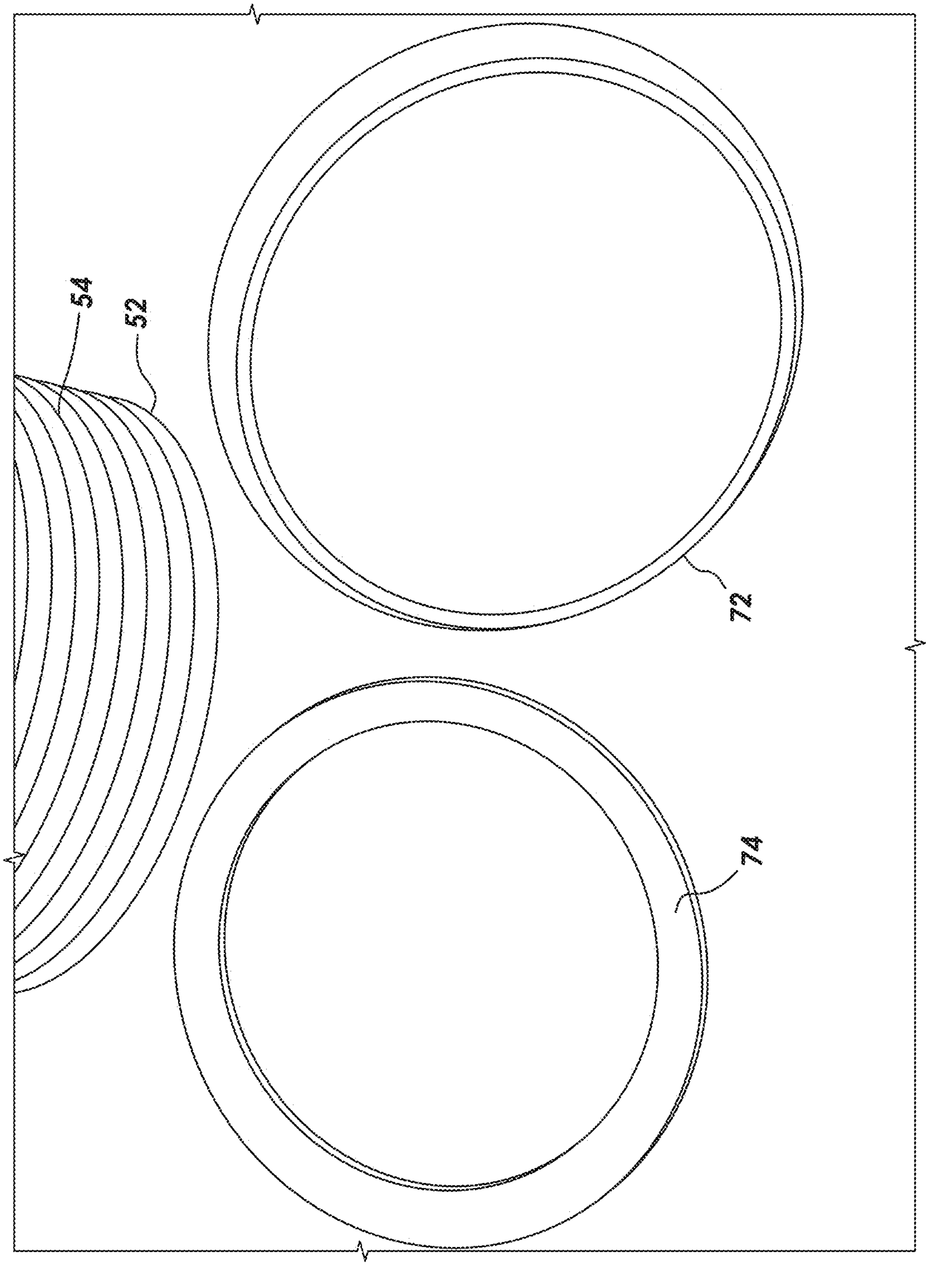
FIG. 4 is a view of portions of the fire suppressing gas generator of FIG. 1 in a stage in the process of assembly.
Figure 5:
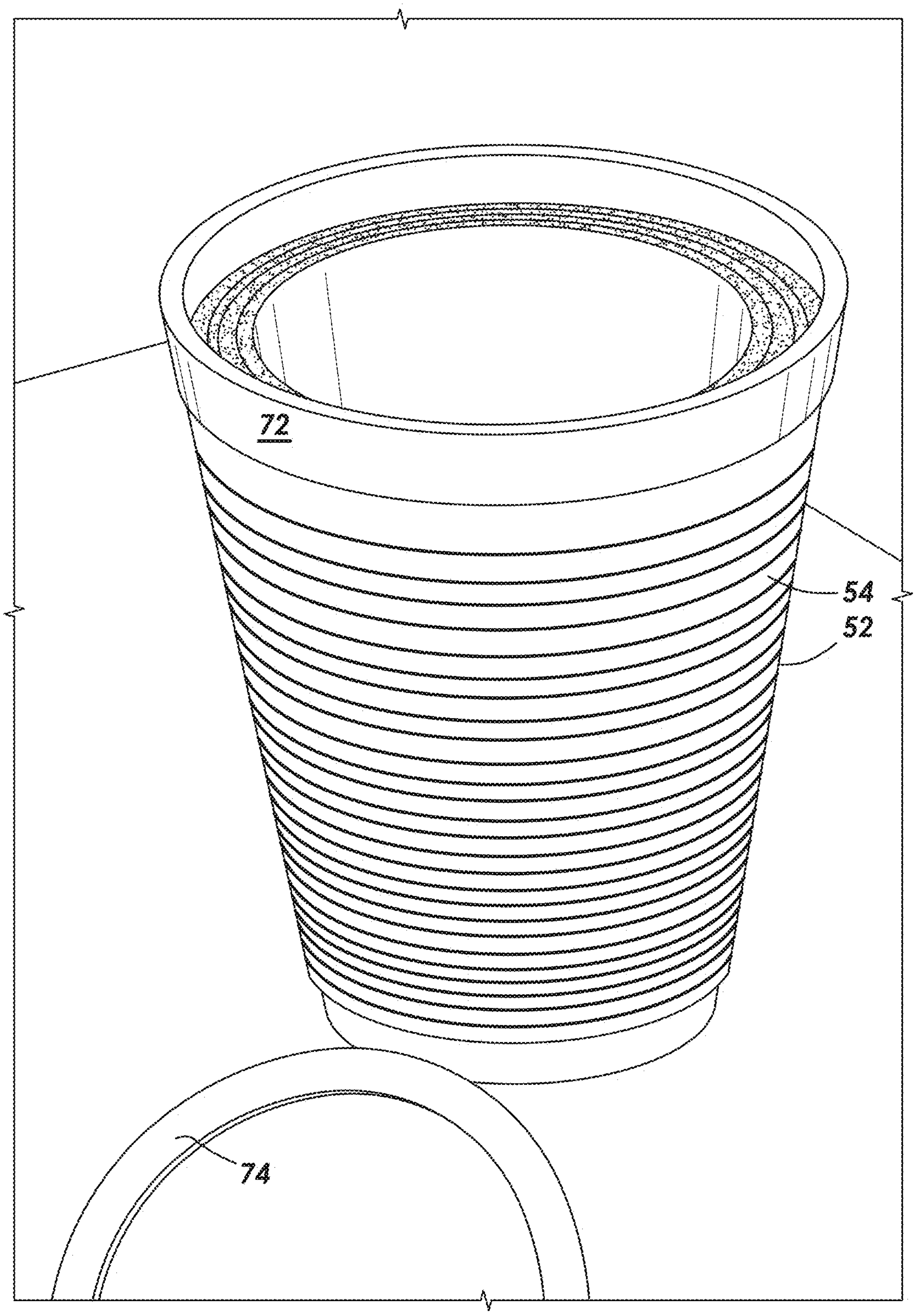
FIG. 5 is a view of portions of the fire suppressing gas generator of FIG. 1 in another stage in the process of assembly.
Figure 6:
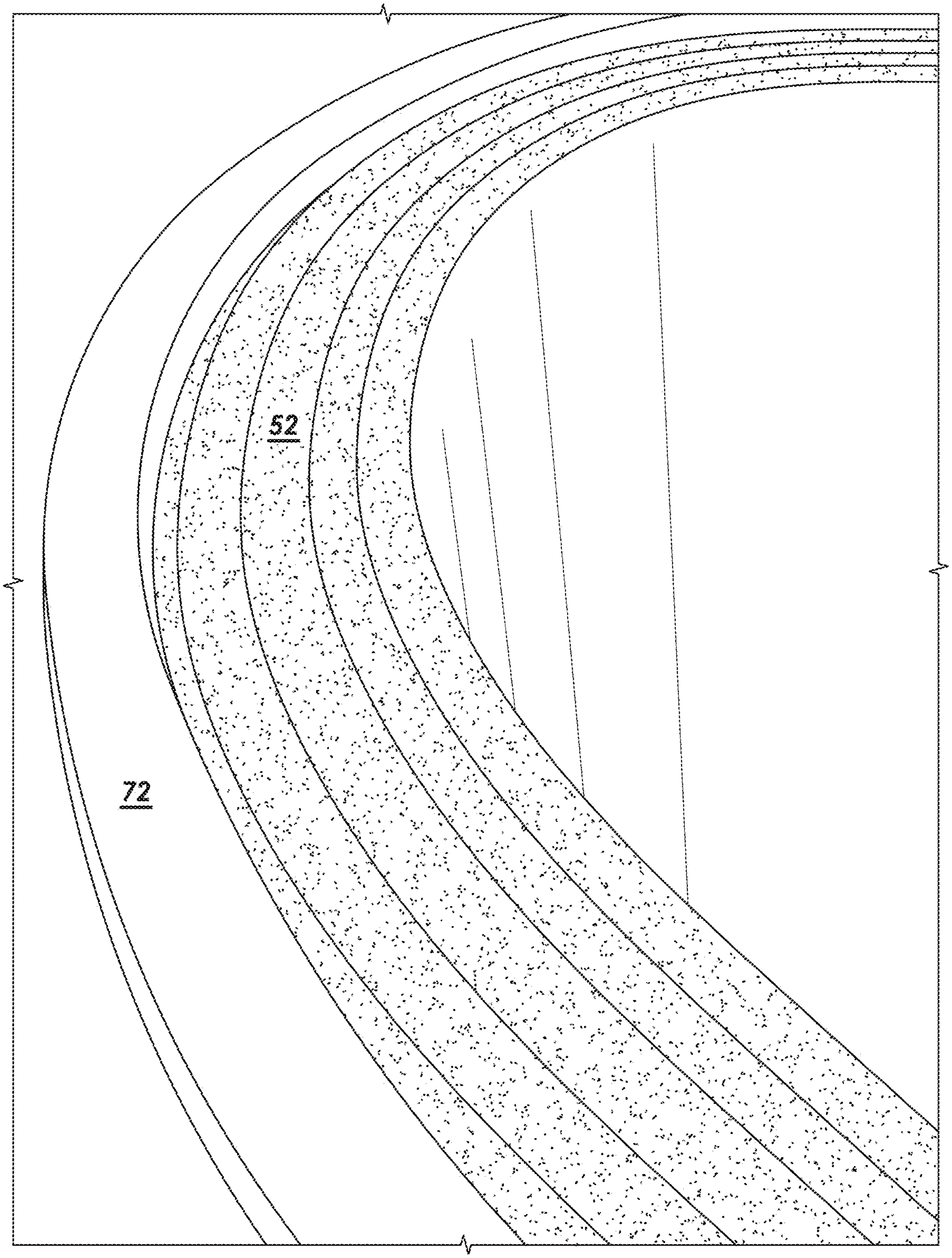
FIG. 6 is a magnified view of the portions of the fire suppressing gas generator of FIG. 1 as shown in FIG. 5.
Figure 7:
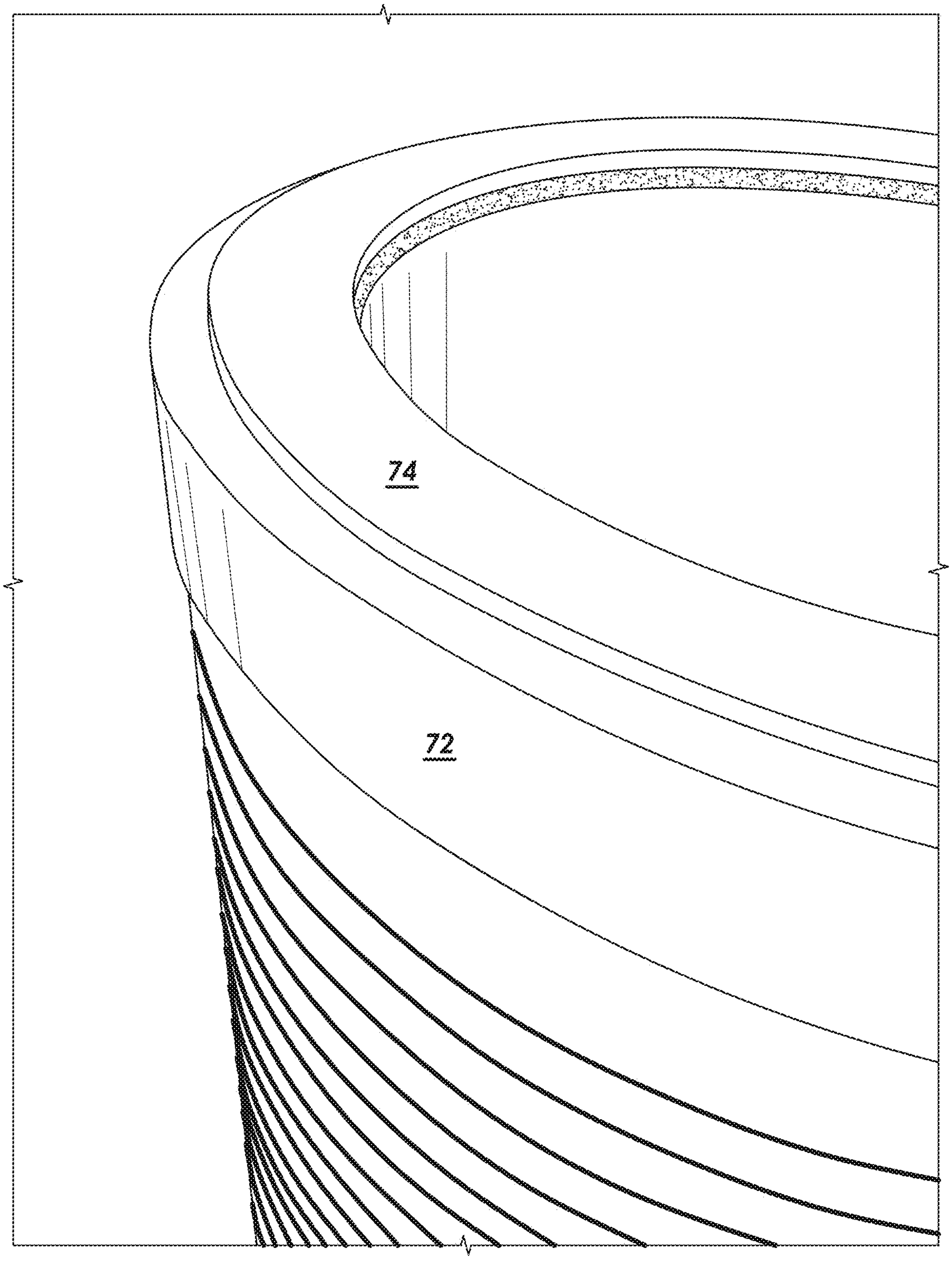
FIG. 7 is a view of portions of the fire suppressing gas generator of FIG. 1 in another stage in the process of assembly.

FIG. 4 is a view of portions of fire suppressing gas generator 10 in a stage in the process of assembly. In particular, gasket 74 and filter-pad centering ring 72 are shown on a surface adjacent to filter pad 52 and the wire coil 54 that is wrapped around it. FIG. 5 is a view of portions of the fire suppressing gas generator 10) in another stage in the process of assembly, in this stage with filter-pad centering ring 72 having been placed atop and partially around filter pad 52 in preparation for insertion of gasket 74. FIG. 6 is a magnified view of the portions of fire suppressing gas generator 10 as shown in FIG. 5, with filter-pad centering ring 72 surrounding the upper portion of filter pad 52. FIG. 7 is a view of portions of the fire suppressing gas generator 10 in another stage in the process of assembly, in particular with gasket 74 having been placed atop of an end of filter pad 52 within the periphery of filter-pad centering ring 72 such that gasket 74 rises slightly above filter-pad centering ring 72 such that it can be compressed against filter pad 52 by other components subsequently assembled.

Figure 8A:
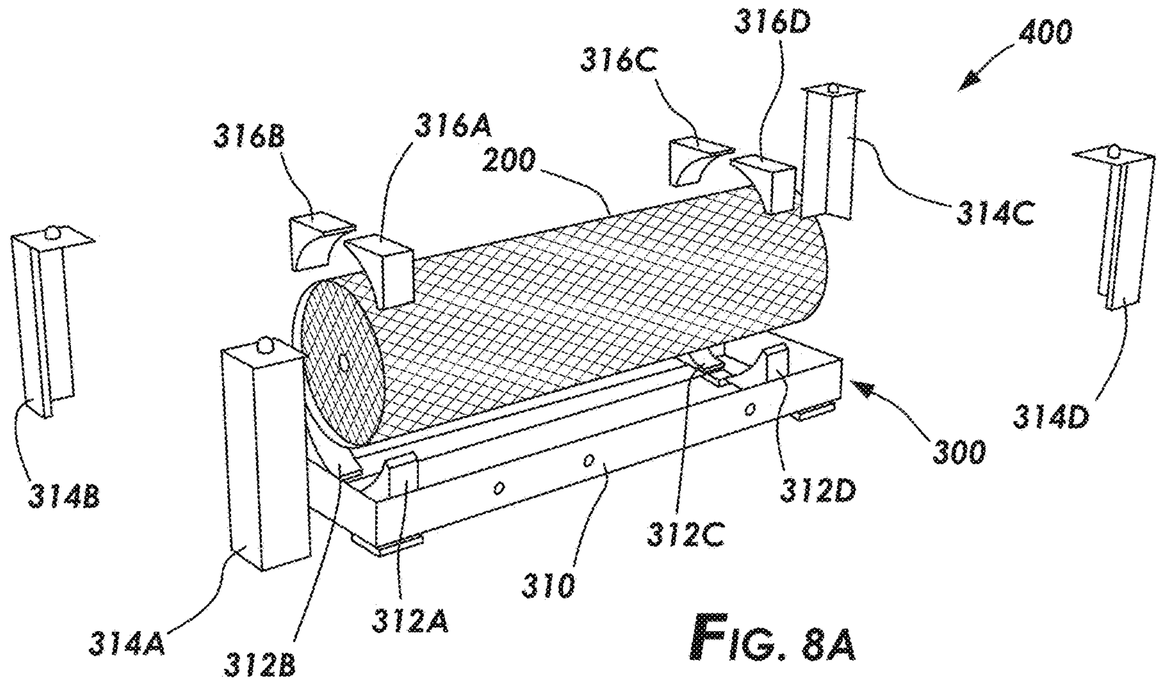
FIG. 8A is an exploded view of a fire suppression arrangement including a fire suppressing gas generator and components of a frame for retaining the fire suppressing gas generator.

FIG. 8A is an exploded view of a fire suppression arrangement 400 including a fire suppressing gas generator 200 and components of a frame 300 for physically retaining the fire suppressing gas generator 200. In this example, fire suppressing gas generator 200 may be the same as or similar to fire suppressing gas generator 10, or may be the same as or similar to other fire suppressing gas generators described herein, such that it has generally the same kind of cylindrical envelope/form factor. Frame 300 includes a number of components that may be assembled "around" fire suppressing gas generator 200 thereby to retain fire suppressing gas generator 200 within frame 300. For example, a base 310 of frame 300) may support lower arcuate corner supports 312A, 312B, 312C, and 312D that are dimensioned to together receive and support an underside of fire suppressing gas generator 200 in the orientation shown. In turn, upper arcuate corner supports 316A, 316B, 316C, and 316D can be set atop respective ends of fire suppressing gas generator 200 and held against fire suppressing gas generator 200 in a fixed position atop base 310 by pillars 314A, 314B, 314C, and 314D which themselves affixable to base 310, thereby to receive and support a top side of fire suppressing gas generator 200 and be retained in place by pillars 314A-314D. Furthermore, the configuration of frame 300 with respect to a respective fire suppressing gas generator 200 enables outside access to ends of the fire suppressing gas generator 200, which—when a valve 66 is at an end of a fire suppressing gas generator 200—in turn enables an inspector to inspect for the presence of the test gas that was initially scaled within the fire suppressing gas generator 400. Because the ends, and thus valve 66, are accessible, such an inspector does not need particular strength or skill to disassemble fire suppressing gas arrangement 400 in order to conduct the testing itself. Each of pillars 314A-314D includes small posts at ends distal to base 310 that can be inserted into respective apertures (not shown, but on base 310) on a side opposite to pillars 314A-314D) of another like frame 300 thereby to enable fire suppression arrangement 400 to be stacked with other like, adjacent, fire suppression arrangements 400.

Figure 8B:
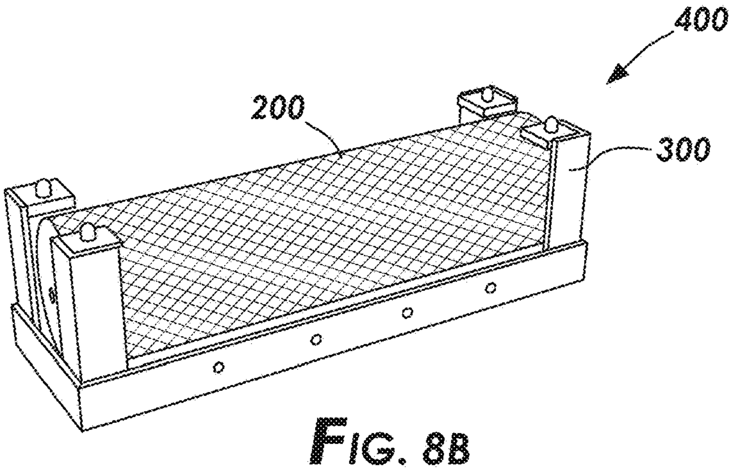
FIG. 8B is an assembled view of the fire suppression arrangement of FIG. 8A in a first orientation.
Figure 8C:
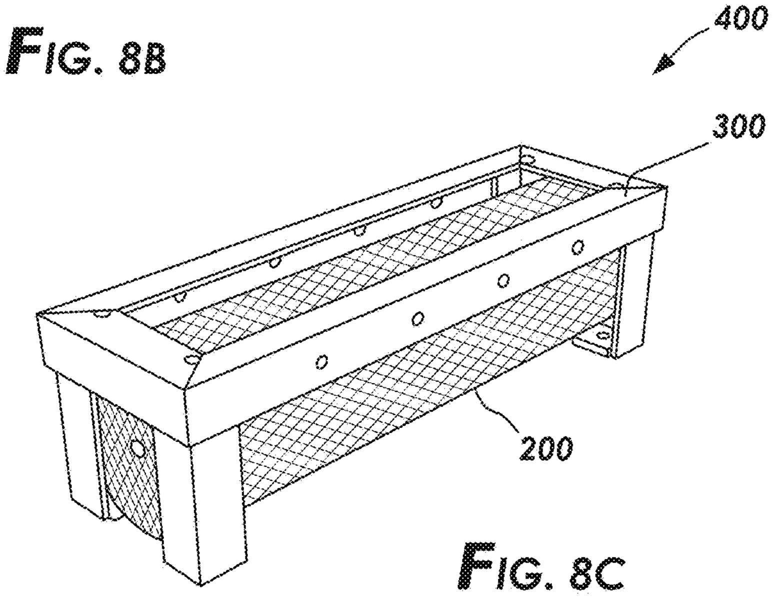
FIG. 8C is an assembled view of the fire suppression arrangement of FIG. 8A in a second orientation.

FIG. 8B is an assembled view of fire suppression arrangement 400 in a first orientation, and FIG. 8C is an assembled view of fire suppression arrangement 400 in a second orientation.

Figure 9:
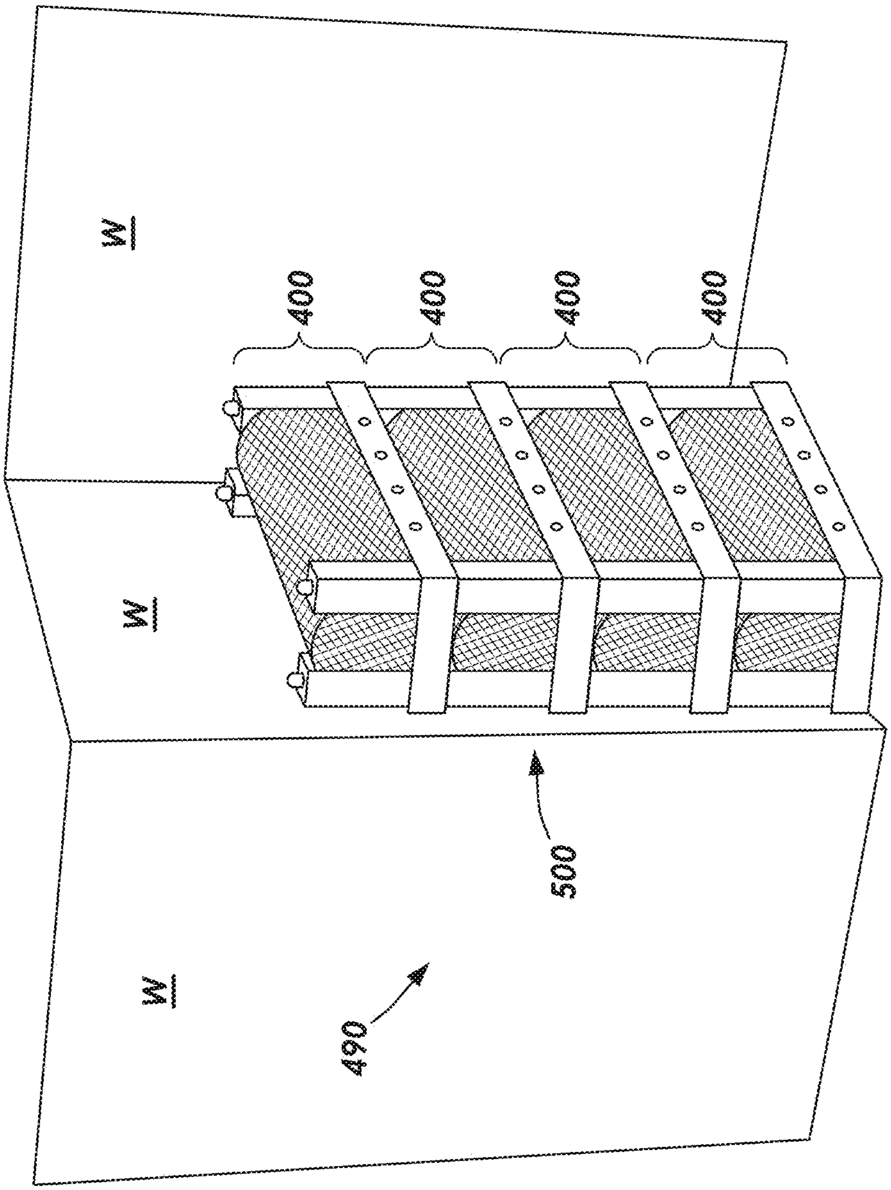
FIG. 9 shows a fire suppression portion of a fire suppression system including multiple of the fire suppression arrangements of FIGS. 8A to 8C stacked atop each other against a wall in a dwelling, such as an engine room, a server room, or some other dwelling.

FIG. 9 shows a fire suppression portion 500 of a fire suppression system 490 including multiple of the fire suppression arrangements 400 of FIGS. 8A to 8C stacked atop each other against a wall W of a dwelling, such as an engine room, a server room, or some other dwelling, thereby enabling multiple fire suppressing generators 200 to be positioned together in the dwelling ready for actuation.

Figure 10:
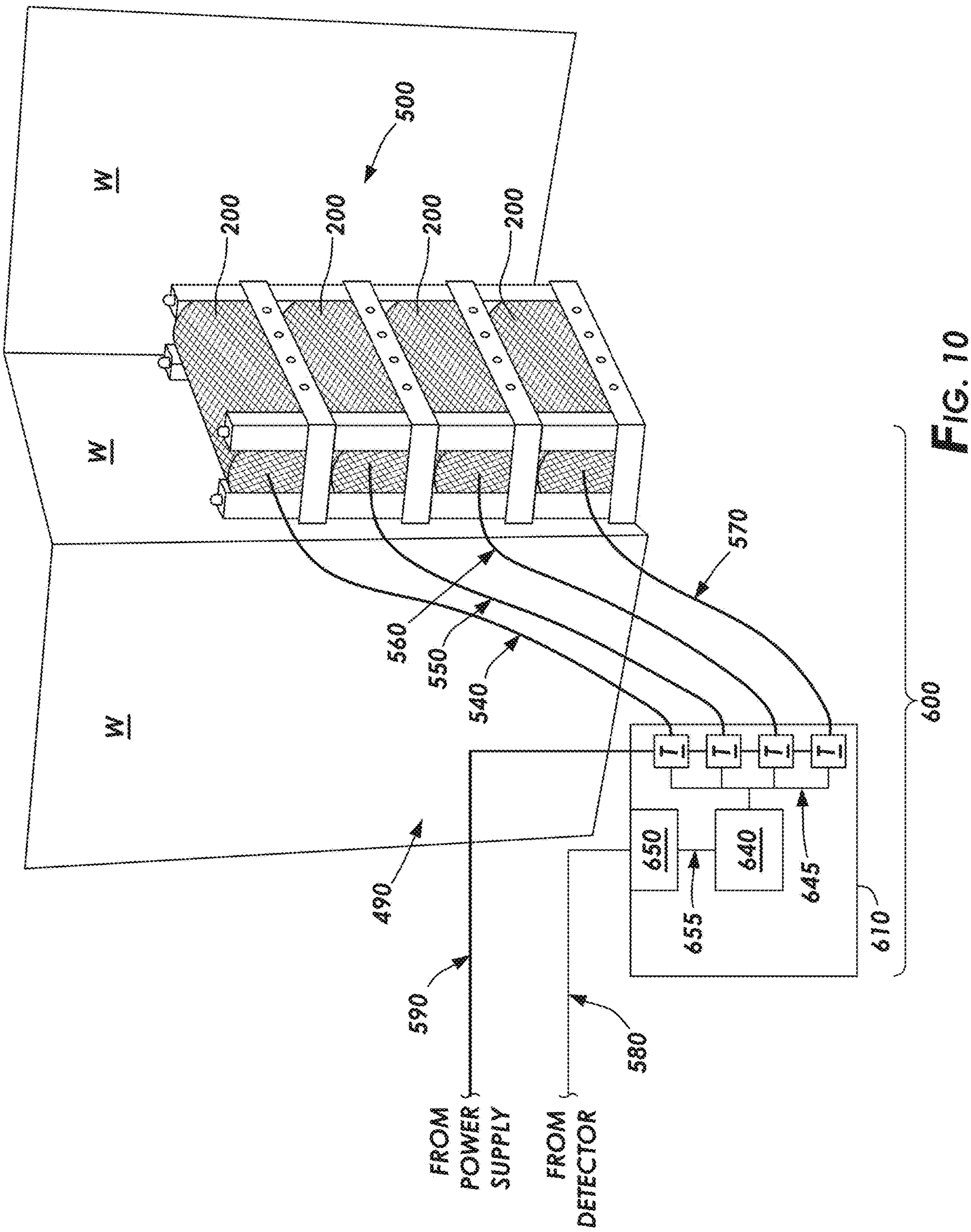
FIG. 10 shows both the fire suppression portion and an actuation portion of the fire suppression system.

FIG. 10 shows both the fire suppression portion 500 and an actuation portion 600 of fire suppression system 490. In this example, each generator 200 of fire suppression system 490) includes an initiator assembly such as initiator assembly 60 described herein, that is electrically actuated to generate a spark in proximity to propellant grains housed within each generator 200. As described herein, ignition of the propellant grains causes the grains to rapidly generate a fire suppressing gas that can exit generator 200 to flood a room.

In some implementations it may be useful to, when a fire is detected, cause simultaneous ignition of all of the respective initiator assemblies of all of the generators of fire suppression system 490. However, in this example, actuation portion 600 contains components that cause staged—or sequential—actuation of the multiple generators 200, thereby to cause staged emission of fire suppression gas into the dwelling. Staged actuation includes relaying ignition power individually to respective ones of the fire suppressing gas generators at spaced intervals i.e., at different times, thereby to cause respective ignitions of the generators at different times. Enabling the fire suppressing gas generators to be actuated sequentially may provide lower magnitude overall pressure shock to a dwelling as compared with that which may occur if simultaneously actuating multiple fire suppressing gas generators. For example, a first of a series of spaced actuations may increase pressure within the dwelling temporarily for a short time and, upon the pressure dropping again as air/fire suppressing gas is able to exit through dwelling vents and the like, a second actuation may be conducted causing the pressure in the dwelling to again rise before dropping again, and so forth. Providing an actuation portion 600 that can be configured to provide staged actuation may be very useful for enabling the overall fires suppression system 490 to be configured to suit a particular dwelling's dimensions and ventilation configuration. In this example, actuation portion 600 includes an electronic circuit 600 itself including a number of components, that interfaces with a signal line 580 that is electrically connected or in communication with a detector (not shown) and/or with a fire suppression control panel (not shown) that sends an actuation signal to electronic circuit 600 upon detection of a fire. Electronic circuit 600 also interfaces with an electrical power supply (not shown) via power line 590) that conveys sufficient power to electronic circuit 600 that can, in turn, be relayed by electronic circuit 600 to generators 200.

More particularly, electronic circuit includes a signal interface 650 in communication via signal line 580 with a detector (not shown) and/or a fire suppression control panel (not shown). Signal interface 650), in turn, is in electrical communication with a central processor 640. Upon receipt by signal interface 650) of a fire detection signal from a fire detector and/or a fire suppression control panel, which signal may be of a particular format, signal interface 650 may in turn provide a digital ignition signal to central processor 640 via line 655. Responsive to receiving the digital ignition signal via line 655, central processor 640) may cause a digital signal on line 645 to switch from high to low (i.e., from 1 to 0) or from low to high (i.e., from 0 to 1). Line 645, in this example, is connected to the TRIGGER input pin on all of multiple timer integrated circuits (IC) T of a timer subsystem. In examples, of IC T may be a 555-type Timer IC available from Texas Instruments of Dallas, Texas. U.S.A. With a 555-type Timer IC, timing intervals can be established by electrically arranging a respective external R-C (Resistor-Capacitor) circuit with respect to its input pins, such that a respective time interval passes between the moment the specified signal reaches its TRIGGER input pin thereby triggering a start of each respective countdown and the moment its OUTPUT pin in turn causes a signal to be placed on line 645. It will be appreciated that alternative timer ICs and configurations of same may be employed.

In this example, each of ICs T is configured through with a respective different countdown time, after which an IC T will trigger the closing of a respective relay (not shown) to connect power from the power supply on line 590 to a respective generator 200 via a respective electrical conduit 540, 550, 560, 570. For example, a first of the ICs T may be configured to have a countdown time of 2 seconds, a second of the ICs T may be configured to have a countdown time of 8 seconds, a third of the ICs T may be configured to have a countdown time of 14 seconds, and a fourth of the ICs T may be configured to have a countdown time of 20 seconds. As such, after central processor 640 promulgates a signal on line 645, such that all ICs T receive the signal on line 645 simultaneously power from power line may be routed via electrical conduit 540 in 2 seconds thereby to actuate the initiator assembly of the first of the generators 200, may be routed via electrical conduit 550 in 8 seconds thereby to actuate the initiator assembly of the second of the generators 200, may be routed via electrical conduit 560 in 14 seconds thereby to actuate the initiator assembly of the third of the generators 200, and may be routed via electrical conduit 570 in 20 seconds thereby to actuate the initiator assembly of the fourth of the generators 200.

It will be appreciated that ICs T may be configured with different timings than those set forth above, which timings are provided as examples for aiding with the explanation of actuation portion 600. For example, the time spacing(s) between ignitions as determined by the countdown timing to which ICs T are respectively configured, may be 0, 6, 12, and 18 seconds, may be 1, 4, 9, 12 seconds, or may be any other timing that is appropriate for the dwelling.

In alternative examples, a single IC may itself include multiple timing circuits, so that a signal to the single IC may initiate multiple countdowns with respective different countdown timings thereby to, in turn, cause actuation of multiple different generators 200.

In alternative examples, a first actuation of a first of generators 200 may not be conducted after a countdown of a IC T. For example, such a first actuation may be conducted by a signal on line 645 directly actuating a relay without an intervening IC T, for enabling power from power supply to be relayed to a generator 200 as a direct result of the signal on line 645.

In alternative examples, an electronic circuit for the actuation portion may include a cascade structure in which a first IC T may receive an initial signal on line 645, and may in turn trigger a respective relay at one time while also, after a delay, trigger an OUTPUT signal on another line that is, in turn, connected to the TRIGGER line of another IC T. Variations are possible.

Variations in the number of generators, and thus the structure of the electronic circuit of the actuation portion, are possible. For example, timed ignitions may be conducted for any number of generators 200 in a fire suppression system, such as two generators 200, three generators 200, five generators 200, and so forth, such that the electronic circuit should have corresponding timing circuits or routines for each. It will be appreciated that a given actuation may actuate multiple generators 200 using the same conduit extending from the electronic circuit but split closer to fire suppression portion 500 of fire suppression system 490.

Figure 11A:
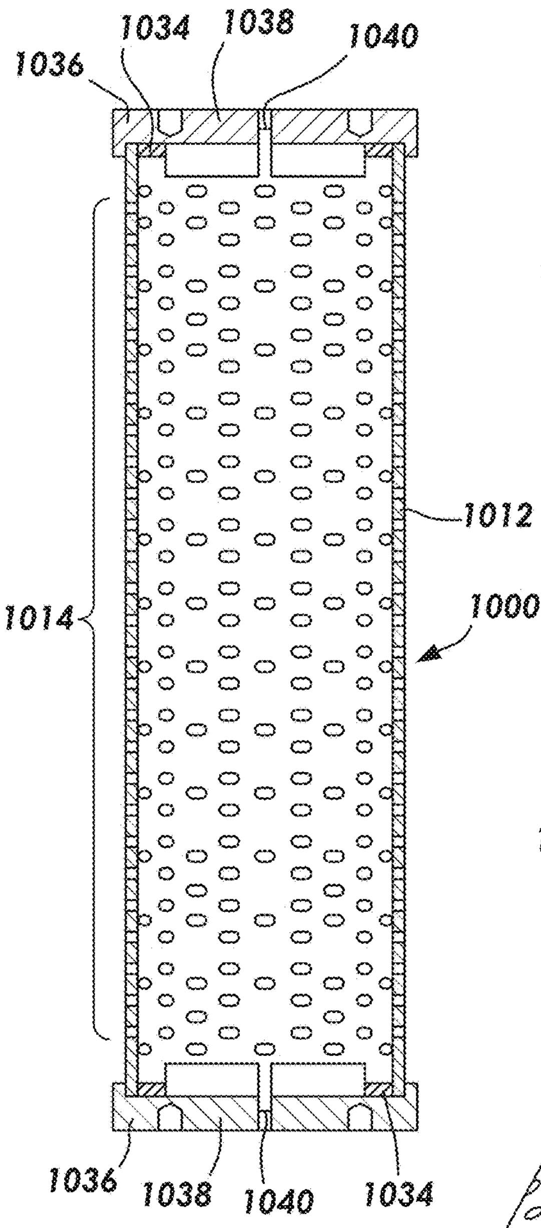
FIGS. 11A, 11B and 11C are respective elevation, cross-sectional, and partial cutaway views of an inner housing component portion, according to an alternative example, and some of its contents.
Figure 11B:
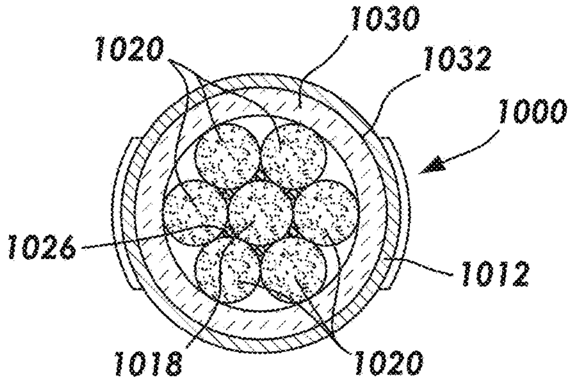
Figure 11C:
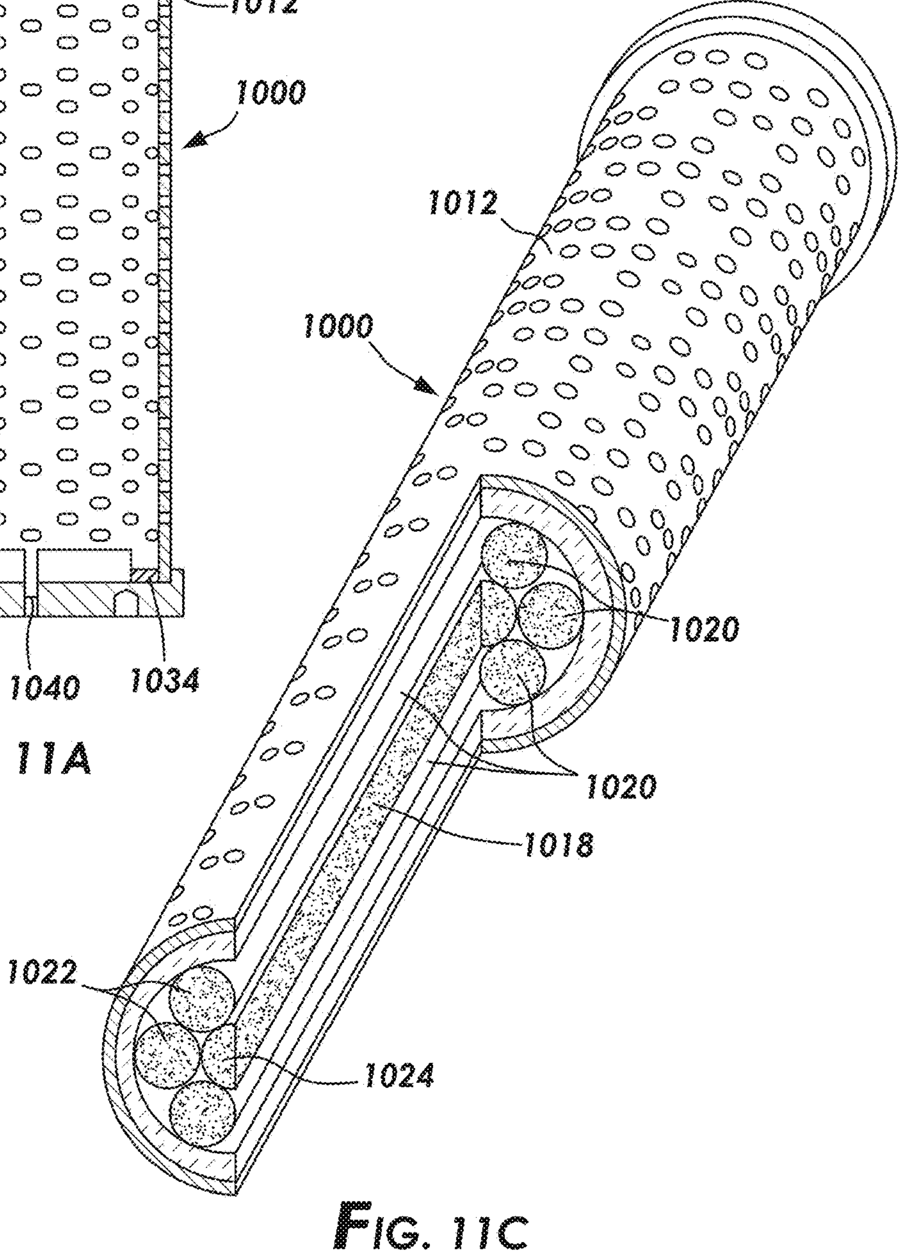

Alternative configurations having respective advantages are contemplated. Some alternative configurations are disclosed in U.S. Pat. No. 8,413,732, the contents of which are incorporated herein by reference. For example. FIGS. 11A, 11B, and 11C are drawings in three views (elevation view, cross-sectional view and perspective partial-cutaway view) of an alternative inner housing component 1000 of a fire suppression gas generator and portions therein. In this example, inner housing component 1000 comprises a housing 1012 formed of a cylindrical steel pipe six (6) inches in diameter and 22.5 inches long. An array of discharge ports 1014 is formed through housing 1012. The discharge ports 1014 in the array are generally uniformly distributed 360 degrees around the cylindrical body of the housing 1012.

A set of sodium-azide/iron oxide solid propellant grains is disposed inside of housing 1012. In this example, the propellant grain set comprises a central column 1018 of 36 (thirty-six) propellant grains including 34 (thirty-four) stacked cylinder-shaped "main" propellant grains 1022 capped on each of its ends with 1 (one) "end" grain 1024. Disposed generally in parallel with the central column and therearound are six outer columns 1020 each comprising 36 (thirty-six) stacked cylinder-shaped main propellant grains 1022. Between the central and outer columns of stacked propellant grains are silicone spacers 1026.

As can be seen, the end propellant grains 1024 in the center column 1018 each have a large bore therethrough sized to receive a portion of an ignition device such as a squib (not shown in FIGS. 11A-11C) as will be described, whereas the main grains 1022 do not have as large a bore. The large-bore geometry of end grain 1024 causes faster burning of the end grain 1024 which in turn encourages ignition of the main grains 1022. In this example, all grains 1022, 1024 in the set however have a plurality of smaller bores or "pin holes" therethrough (not shown). The smaller bores through the propellant grains 1022, 1024 facilitate faster ignition of each grain 1022, 1024 through greater surface area of the grain material being exposed to increase oxidation, and also facilitate the escape of the resultant fire suppressing gas such as nitrogen (N2) from the burning propellant grains 1022, 1024. It will be appreciated that, in other examples, propellant grains may not have any of these smaller bores, in which case, all other things being equal, the propellant grains would not ignite as quickly due to having less initial exposed surface area. Therefore, in general it will be appreciated that overall timing of gas production and its duration can be at least partially controlled through the grain production process, in particular by producing grains that have a higher or lower exposed surface area. This may be done using different overall shape envelopes or through the provision of the smaller bores. It will also be appreciated that some grains in a given fire suppressing gas generator may have such bores, and others may not, or still others may have slightly larger bores and/or different overall shape envelopes, in order to provide the manufacturer with control over the speed and duration of production of fire suppressing gas upon ignition. It will be appreciated, however, that generally puck-shaped grains provide are straightforward to make and to stack, do not have sharp edges that can easily break off of the whole during assembly, transportation, and installation, and can be made to provide a useful surface area to volume combination.

Disposed between the set of propellant grains and the housing is a filter pad 1030. In this example the filter pad 1030 comprises an inner coarse-screen steel mesh and an outer fine-screen steel mesh. Interposed between the coarse-screen mesh and the fine-screen mesh are layers of steel wool and preferably non-biopersistent (non-carcinogenic) ceramic "paper" material. In this example, the steel wool is a fine #000 steel wool, with a 35 micron fiber size. Preferably, the steel wool is an extra fine #0000 fiber size.

In this example the ceramic material is the UNIFRAX 1-2 micron fiber PC204 material, with a composition of 52%

$SiO_2$. 46% $Al_2O_3$, and 2% other material. Alternatives such as the UNIFRAX 2-4 micron fiber PC440 material may be used. The above-noted UNIFRAX materials are known as "Category 2" materials in the European Union's "FIBER DIRECTIVE", otherwise known as Directive 97/69/EC. "Category 3" materials such as the following may be usable: an INSULFRAX 3.2 micron fiber, 64% $SiO_2$, 30% CaO, 5% MgO, 1% $Al_2O_3$ material, an ISOFRAX 4 micron fiber. 75% $SiO_2$, 23% MgO, 2% Other material, and a FIBROX 5.5 micron fiber, 47% $SiO_2$, 23% CaO, 9% MgO, 14% $Al_2O_3$, 7% Other material. Thermal Ceramics Incorporated of Augusta. Ga., U.S.A. provides ceramic materials also that may be viable.

During manufacture, the outer fine-mesh screen and the steel wool and ceramic layers are rolled together and formed into a cylinder around the coarse-mesh screen to form the cylindrical filter pad 1030. If the steel wool and/or mesh screens being employed hold machine oil, then the filter pad 1030 is baked to burn off any machine oil attached thereto at this point. The burning off of the machine oil prior to use of the generator ensures that the machine oil does not get discharged along with the fire suppressing gas during use. It will be understood that, alternatively the steel wool and meshes could be baked prior to assembly.

The filter pad 1030 functions to inhibit escape of particulates from the interior of the generator 1000 when the grains 1022, 1024 are ignited, and also to absorb some of the heat generated upon ignition of the grains 1022, 1024.

More particularly, the ceramic fibers are considered the main filtration element, with the steel wool on the inner layers being the course filter element. The steel wool also advantageously inhibits or stops the tunneling that can occur otherwise if the ceramic material is locally attacked by sodium oxide ($Na_2O$). The sodium oxide tends to cause the ceramic material to reach a lower melting point and as a result form holes in the filter. As such, when the sodium oxide hits the steel wool the local attack is blunted and spread out so that when it reaches the next ceramic layer is has a broad front. The outer fine steel mesh layer serves as a mechanical support, whereas the inner coarse mesh tube defines the inner diameter of the filter pad 1030.

Directly against the inner surface of the housing 1012 is a hermetic sealing layer (not shown) for preventing or significantly inhibiting ambient moisture from entering the housing 1012 through the discharge ports and being absorbed in the solid propellant grains. As shown in the figures, the discharge ports 1014 have a "figure eight" shape formed by drilling/punching two proximate and connected holes through the housing 1012. This shape of discharge port 1014 advantageously provides two sharp points at the midpoint of the discharge port 1014 against which the hermetic sealing layer is generally forced upon its expansion upon ignition due to internal pressure buildup. While preferably the hermetic sealing layer would be of such a material that would be ripped due to internal pressure alone, the sharp points provide increased chance of piercing of the hermetic sealing due to the increased internal pressure to allow the fire suppressing gas to escape. It will be understood that other shapes of holes could be provided that encourage piercing of the hermetic sealing layer in this manner.

Directly inside the hermetic sealing layer surrounding the filter pad is a plenum space formed by a spacer, which in this example is 1/16 inch wire 1032 that is wrapped around the filter pad 1030. The wire 1032 functions to provide the plenum space between the filter pad 1030 and the interior wall of the housing 1012 so that fire suppressing gas, generated upon ignition first at the ends of the housing 1012 and then progressively inwards from the ends, can exit from numerous additional discharge ports 1014 and not only those that are located directly adjacent the burning propellant grains 1022, 1024. Thus, internal pressure built up during ignition can be distributed through the plenum space assured by the wire 1032 across the set of discharge ports 1014, which serves to limit the buildup of internal pressure during use. The wire 1032 also beneficially functions to maintain the filter pad 1030) in a cylindrical shape for insertion of the propellant grains 1022, 1024 therein particularly during manufacture of the generator 1000. The wire 1032 also absorbs some of the heat generated upon ignition of the grains 1022, 1024.

A silicone sealing gasket 1034 is positioned at each end of the housing 1012 over each end of the cylindrical filter pad 1030. Also at each end of the housing 1012, a filter-pad centering ring 1036 extends past the ends of the housing 1012. With the sealing gasket 1034 in place, the end cap 1038 may be pressed against the gasket 1034, compressing gasket 1034 between filter pad 1030 and end cap 1038 as end cap 1038 meets filter-pad centering ring 1036. End caps 1038 may then be affixed in place, to seal the end of the housing 1012. Preferably, particularly in order to meet transportation safety and security regulations, the end caps 1038 are adapted to be crimped, screwed, or otherwise relatively permanently secured onto the end of an adapted housing 1012 so that the end caps 1038 cannot practically be removed.

At least one of the end caps 1038, and typically in practical implementations only one of the end caps 1038, has a central bore 1040 therethrough for receiving a squib barrel in a strong snap- or threaded fit. The squib barrel extends through the end cap 1038 and extends at least partially into the central bore of the end propellant grain 1024. The sealing gasket 1036 held in place by the end cap 1038 functions to substantially prevent the exit of generated fire suppressing gas through the ends of the filter pad 1030) and out of the housing 1012. This ensures that the generated fire suppressing gas escapes through the discharge ports 1014 of the housing 1012 via the filter pad 1030.

While examples have been described, alternatives are possible.

For example, while fire suppressing gas generators described herein are cylindrical, alternative generator "envelope" shapes and formats are possible, provided that the fire suppressing gas may be released in a thrust neutral manner.

Also, while the outer housing component of fire suppressing gas generators described herein are formed primarily as a steel cage, alternative examples may include an outer housing component with a cage that formed of another kind of metal or other material suitable for inhibiting access to or contact of the inner housing component it encapsulates. Alternatively, an alternative outer housing component may have characteristics that are less like a cage and more like an outer sleeve. An alternative outer housing component may have an outer form factor that is not cylindrical, despite encapsulating (for example) a cylindrical inner housing component.

In other examples, cooperation between the inner housing component and the outer housing component may together provide overall thrust neutrality of a fire suppressing gas generator. For example, examples may be considered wherein distribution of the discharge ports on an inner housing component provides substantially thrust bias to the inner housing component when the fire suppressing gas passes out of the discharge ports, while the distribution of the openings on the outer housing component provides substantially thrust neutrality to the outer housing component when the fire suppressing gas passes out of the openings.

In examples described herein, the inner housing component and the outer housing component are maintained in a fixed spaced relationship using rigid rings. Other structures for maintaining these components in a fixed spaced relationship and that, like the rigid rings, withstand vibration testing and other rigorous tests to ensure overall integrity, may be employed as alternatives.

While shapes of propellant grains described herein may be regarded as cylindrical "pucks", other form factors are possible.

Unless otherwise explained, all technical terms used herein have the same meaning as commonly understood by one of ordinary skill in the art to which this disclosure belongs. Although any methods and materials similar or equivalent to those described herein can be used in the practice for testing of the present invention, the typical materials and methods are described herein. In describing and claiming the present invention, the following terminology will be used.

It is also to be understood that the terminology used herein is for the purpose of describing particular aspects only and is not intended to be limiting. Patent applications, patents, and publications are cited herein to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms. "including". "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention.

It will be understood that any component defined herein as being included may be explicitly excluded from the claimed invention by way of proviso or negative limitation.

In addition, all ranges given herein include the end of the ranges and also any intermediate range points, whether explicitly stated or not.

Terms of degree such as "substantially". "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The abbreviation, "e.g." is derived from the Latin exempli gratia, and is used herein to indicate a non-limiting example. Thus, the abbreviation "e.g." is synonymous with the term "for example." The word "or" is intended to include "and" unless the context clearly indicates otherwise.

While examples have been described, alternatives are possible.

Clauses

Clause 1. A fire suppressing gas generator comprising: a housing structure comprising: an inner housing component comprising an array of discharge ports distributed thereon; an outer housing component encapsulating the inner housing component and comprising an array of openings distributed thereon; and spacing structure extending between the inner housing component and the outer housing component to maintain the inner housing component and the outer housing component in a fixed spaced relationship; and a fire suppression subsystem comprising: a filter disposed within the inner housing component and spaced from an interior wall of the inner housing component; a plurality of propellant grains inside the filter, the plurality of propellant grains comprising at least one column of stacked propellant grains, each of the propellant grains comprising a pressed mixture of sodium azide and iron oxide; and at least one ignition device associated with the propellant grains, wherein the propellant grains when ignited by the ignition device generate a fire suppressing gas which passes through the filter and out of the discharge ports of the inner housing component; wherein distributions of the discharge ports of the inner housing component and the openings of the outer housing component provide substantial thrust neutrality to the fire suppressing gas generator when the fire suppressing gas passes out of the housing structure.

Clause 2. The fire suppressing gas generator of clause 1, wherein the inner housing component is a cylindrical inner housing component and the filter is a cylindrical filter.

Clause 3. The fire suppressing gas generator of clause 1, wherein distribution of the discharge ports on the inner housing component provides substantially thrust neutrality to the inner housing component when the fire suppressing gas passes out of the discharge ports.

Clause 4. The fire suppressing gas generator of clause 3, wherein distribution of the openings on the outer housing component do not substantially impart thrust bias to the outer housing component when the fire suppressing gas passes out of the openings.

Clause 5. The fire suppressing gas generator of clause 3, wherein the outer housing component is a cage.

Clause 6. The fire suppressing gas generator of clause 5, wherein the outer housing component is cylindrical.

Clause 7. The fire suppressing gas generator of clause 6, wherein the cage comprises: a cylindrical mesh body having an open end and a closed end opposite the open end; and a first mesh cover closing the open end.

Clause 8. The fire suppressing gas generator of clause 1, wherein distribution of the discharge ports on the inner housing component provides substantially thrust bias to the inner housing component when the fire suppressing gas passes out of the discharge ports; and wherein distribution of the openings on the outer housing component provides substantially thrust neutrality to the outer housing component when the fire suppressing gas passes out of the openings.

Clause 9. The fire suppressing gas generator of clause 1, wherein the spacing structure comprises: a first end cap dimensioned to be received within a first end of the outer housing component, the first end cap having a first outward-facing surface and a first inward-facing surface opposite the first outward-facing surface, the first inward-facing surface having an annular region spaced from a periphery of the first end cap and dimensioned to receive a first end of the inner housing component thereby to hold the first end of the inner housing component in the fixed spaced relationship with the outer housing component; and a second end cap dimensioned to be received within a second end of the outer housing component opposite the first end, the second end cap having a second outward-facing surface and a second inward-facing surface opposite the second outward-facing surface, the second inward-facing surface having an annular region spaced from a periphery of the second end cap and dimensioned to receive a second end of the inner housing component thereby to hold the second end of the inner housing component in the fixed spaced relationship with the outer housing component.

Clause 10. The fire suppressing gas generator of clause 3, wherein the spacing structure comprises: a plurality of rigid rings each extending between the inner housing component and the outer housing component.

Clause 11. The fire suppressing gas generator of clause 10, wherein each of the plurality of rigid rings comprises wood.

Clause 12. The fire suppressing gas generator of clause 2, wherein the filter is spaced from the interior wall of the inner housing component with a wire wrapped around the filter.

Clause 13. The fire suppressing gas generator of clause 2, wherein the filter comprises a layer of fine-mesh screen and a layer of coarse-mesh screen.

Clause 14. The fire suppressing gas generator of clause 13, wherein the filter further comprises layers of steel wool and ceramic material.

Clause 15. The fire suppressing gas generator of clause 13, wherein the filter further comprises a layer of ceramic material.

Clause 16. The fire suppressing gas generator of clause 1, wherein the plurality of propellant grains comprises a plurality of columns of stacked propellant grains.

Clause 17. The fire suppressing gas generator of clause 12, further comprising a foil layer between the interior wall and the wire.

Clause 18. The fire suppressing gas generator of clause 16, wherein the stacked propellant grains are each cylindrical.

Clause 19. The fire suppressing gas generator of clause 16, wherein the plurality of columns comprises a central column and a plurality of generally parallel columns therearound.

Clause 20. The fire suppressing gas generator of clause 1, wherein the plurality of propellant grains comprises a single column of stacked propellant grains.

Clause 21. The fire suppressing gas generator of clause 1, comprising end caps fastened to respective first and second ends of the inner housing component.

Clause 22. The fire suppressing gas generator of clause 21, further comprising a gasket between each of the end caps and a respective end of the filter.

Clause 23. The fire suppressing gas generator of clause 1, wherein distribution of the discharge ports is on opposite sides of the inner housing component.

Clause 24. The fire suppressing gas generator of clause 1, wherein the discharge ports are distributed generally uniformly around the inner housing component.

Clause 25. A fire suppression system comprising: a fire suppression portion comprising a plurality of the fire suppressing gas generator as set forth in clause 1; and an actuation portion causing staged actuation of the plurality of the fire suppressing gas generator.

Clause 26. The fire suppression system of clause 25, wherein the actuation portion comprises: an electronic circuit configured to receive an actuation signal from a fire detector and/or a fire suppression control panel and to, responsive to receiving the actuation signal, relay power individually via respective electrical conduits to the at least one ignition device of respective ones of the fire suppressing gas generators at spaced intervals thereby to cause respective ignitions of the fire suppressing gas generators at spaced intervals.

Clause 27. The fire suppression system of clause 26, wherein the electronic circuit comprises: a signal interface for receiving the actuation signal; a timer subsystem including at least one timer integrated circuit for relaying power to a respective one of the fire suppressing gas generators after a respective countdown; and a central processor for triggering a start of each respective countdown of the at least one timer integrated circuit of the timer subsystem responsive to the signal interface receiving the actuation signal.

Clause 28. A fire suppression arrangement comprising: a fire suppressing gas generator as set forth in clause 1; and a frame physically retaining the fire suppressing gas generator.

Clause 29. The fire suppression arrangement of clause 28, wherein the frame comprises: a base; a plurality of upper arcuate supports dimensioned to receive and support an underside of the fire suppressing gas generator: a plurality of lower arcuate supports dimensioned to receive and support a top side of the fire suppressing gas generator; and a plurality of pillars extending from and affixable to the base to retain the upper arcuate supports and the lower arcuate supports against the fire suppressing gas generator thereby to retain the fire suppressing gas generator within the frame.

Clause 30. The fire suppression arrangement of clause 29, further comprising a post at an end of each pillar distal from the base, and respective apertures on a side of the base opposite to the pillars.

Clause 31. A fire suppression system comprising: a stack of multiple of the fire suppression arrangements of clause 29, wherein posts of fire suppression arrangements are inserted into apertures of adjacent fire suppression arrangements.

Clause 32. The fire suppressing gas generator of clause 1, wherein the fire suppression subsystem is hermetically sealed within an interior of the inner housing component.

Clause 33. The fire suppressing gas generator of clause 32, further comprising: at least one inert test gas sealed within the inner housing component; at least one normally closed valve extending from an exterior of the inner housing component to the interior of the inner housing component for, when caused to be opened, extracting a quantum of the inert test gas thereby to confirm the hermetic sealing of the fire suppression subsystem.

Clause 34. The fire suppressing gas generator of clause 2, further comprising: a ring at each of opposite ends of the cylindrical inner housing component for centering respective ends of the cylindrical filter within the cylindrical inner housing component; an end cap connectable to each of opposite ends of the cylindrical inner housing component for retaining the fire suppression subsystem within the cylindrical inner housing component; and a gasket within a respective ring at each of the opposite ends of the cylindrical inner housing component and between a respective end cap and the cylindrical filter, wherein prior to connecting of the end caps and the cylindrical inner housing component each gasket extends beyond the respective ring and is compressible between the respective end cap and the cylindrical filter.

Clause 35. A fire suppressing gas generator comprising: a housing structure comprising an inner housing component having an array of discharge ports distributed thereon; a fire suppression subsystem hermetically sealed within the inner housing component and comprising: a filter disposed within the inner housing component and spaced from an interior wall of the inner housing component; a plurality of propellant grains inside the filter, the plurality of propellant grains comprising at least one column of stacked propellant grains, each of the propellant grains comprising a pressed mixture of sodium azide and iron oxide; and at least one ignition device associated with the propellant grains, wherein the propellant grains when ignited by the ignition device generate a fire suppressing gas which passes through the filter and out of the discharge ports of the inner housing component; and at least one inert test gas sealed within the inner housing component; and at least one normally closed valve extending from an exterior of the inner housing component to the interior of the inner housing component for, when caused to be opened, extracting a quantum of the inert test gas thereby to confirm the hermetic sealing of the fire suppression subsystem.

Clause 36. A fire suppressing gas generator comprising: a housing structure comprising a cylindrical inner housing component having an array of discharge ports distributed thereon; a fire suppression subsystem within the cylindrical inner housing component and comprising: a cylindrical filter disposed within the inner housing component and spaced from an interior wall of the cylindrical inner housing component; a plurality of propellant grains inside the filter, the plurality of propellant grains comprising at least one column of stacked propellant grains, each of the propellant grains comprising a pressed mixture of sodium azide and iron oxide; and at least one ignition device associated with the propellant grains, wherein the propellant grains when ignited by the ignition device generate a fire suppressing gas which passes through the filter and out of the discharge ports of the cylindrical inner housing component; a ring at each of opposite ends of the cylindrical inner housing component for centering respective ends of the cylindrical filter within the cylindrical inner housing component; an end cap connectable to each of opposite ends of the cylindrical inner housing component for retaining the fire suppression subsystem within the cylindrical inner housing component; and a gasket within a respective ring at each of the opposite ends of the cylindrical inner housing component and between a respective end cap and the cylindrical filter, wherein prior to connecting of the end caps and the cylindrical inner housing component each gasket extends beyond the respective ring and is compressible between the respective end cap and the cylindrical filter.

What is claimed is:

1. A fire suppressing gas generator comprising:

a housing structure comprising:

an inner housing component comprising an array of discharge ports distributed thereon;

an outer housing component encapsulating the inner housing component and comprising an array of openings distributed thereon; and spacing structure extending between the inner housing component and the outer housing component to maintain the inner housing component and the outer housing component in a fixed spaced relationship;

and a fire suppression subsystem comprising:

a filter disposed within the inner housing component and spaced from an interior wall of the inner housing component;

a plurality of propellant grains inside the filter, the plurality of propellant grains comprising at least one column of stacked propellant grains, each of the propellant grains comprising a pressed mixture of sodium azide and iron oxide; and at least one ignition device associated with the propellant grains, wherein the propellant grains when ignited by the ignition device generate a fire suppressing gas which passes through the filter and out of the discharge ports of the inner housing component;

wherein distributions of the discharge ports of the inner housing component and the openings of the outer housing component provide substantial thrust neutrality to the fire suppressing gas generator when the fire suppressing gas passes out of the housing structure.

2. The fire suppressing gas generator of claim 1, wherein the inner housing component is a cylindrical inner housing component and the filter is a cylindrical filter.

3. The fire suppressing gas generator of claim 1, wherein distribution of the discharge ports on the inner housing component provides substantially thrust neutrality to the inner housing component when the fire suppressing gas passes out of the discharge ports.

4. The fire suppressing gas generator of claim 3, wherein distribution of the openings on the outer housing component do not substantially impart thrust bias to the outer housing component when the fire suppressing gas passes out of the openings.

5. The fire suppressing gas generator of claim 3, wherein the outer housing component is a cage.

6. The fire suppressing gas generator of claim 5, wherein the outer housing component is cylindrical.

7. The fire suppressing gas generator of claim 6, wherein the cage comprises:

a cylindrical mesh body having an open end and a closed end opposite the open end; and a first mesh cover closing the open end.

8. The fire suppressing gas generator of claim 1, wherein distribution of the discharge ports on the inner housing component provides substantially thrust bias to the inner housing component when the fire suppressing gas passes out of the discharge ports; and wherein distribution of the openings on the outer housing component provides substantially thrust neutrality to the outer housing component when the fire suppressing gas passes out of the openings.

9. The fire suppressing gas generator of claim 1, wherein the spacing structure comprises:

a first end cap dimensioned to be received within a first end of the outer housing component, the first end cap having a first outward-facing surface and a first inward-facing surface opposite the first outward-facing surface, the first inward-facing surface having an annular region spaced from a periphery of the first end cap and dimensioned to receive a first end of the inner housing component thereby to hold the first end of the inner housing component in the fixed spaced relationship with the outer housing component; and a second end cap dimensioned to be received within a second end of the outer housing component opposite the first end, the second end cap having a second outward-facing surface and a second inward-facing surface opposite the second outward-facing surface, the second inward-facing surface having an annular region spaced from a periphery of the second end cap and dimensioned to receive a second end of the inner housing component thereby to hold the second end of the inner housing component in the fixed spaced relationship with the outer housing component.

10. The fire suppressing gas generator of claim 3, wherein the spacing structure comprises:

a plurality of rigid rings each extending between the inner housing component and the outer housing component.

11. The fire suppressing gas generator of claim 10, wherein each of the plurality of rigid rings comprises wood.

12. The fire suppressing gas generator of claim 2, wherein the filter is spaced from the interior wall of the inner housing component with a wire wrapped around the filter.

13. The fire suppressing gas generator of claim 2, wherein the filter comprises a layer of fine-mesh screen and a layer of coarse-mesh screen.

14. The fire suppressing gas generator of claim 13, wherein the filter further comprises layers of steel wool and ceramic material.

15. The fire suppressing gas generator of claim 13, wherein the filter further comprises a layer of ceramic material.

16. The fire suppressing gas generator of claim 1, wherein the plurality of propellant grains comprises a plurality of columns of stacked propellant grains.

17. The fire suppressing gas generator of claim 12, further comprising a foil layer between the interior wall and the wire.

18. The fire suppressing gas generator of claim 16, wherein the stacked propellant grains are each cylindrical.

19. The fire suppressing gas generator of claim 16, wherein the plurality of columns comprises a central column and a plurality of generally parallel columns therearound.

20. The fire suppressing gas generator of claim 1, wherein the plurality of propellant grains comprises a single column of stacked propellant grains.

21. The fire suppressing gas generator of claim 1, comprising end caps fastened to respective first and second ends of the inner housing component.

22. The fire suppressing gas generator of claim 21, further comprising a gasket between each of the end caps and a respective end of the filter.

23. The fire suppressing gas generator of claim 1, wherein distribution of the discharge ports is on opposite sides of the inner housing component.

24. The fire suppressing gas generator of claim 1, wherein the discharge ports are distributed generally uniformly around the inner housing component.

25. A fire suppression system comprising:

a fire suppression portion comprising a plurality of the fire suppressing gas generator as set forth in claim 1; and an actuation portion causing staged actuation of the plurality of the fire suppressing gas generator.

26. The fire suppression system of claim 25, wherein the actuation portion comprises:

an electronic circuit configured to receive an actuation signal from a fire detector and/or a fire suppression control panel and to, responsive to receiving the actuation signal, relay power individually via respective electrical conduits to the at least one ignition device of respective ones of the fire suppressing gas generators at spaced intervals thereby to cause respective ignitions of the fire suppressing gas generators at spaced intervals.

27. The fire suppression system of claim 26, wherein the electronic circuit comprises:

a signal interface for receiving the actuation signal;

a timer subsystem including at least one timer integrated circuit for relaying power to a respective one of the fire suppressing gas generators after a respective countdown; and a central processor for triggering a start of each respective countdown of the at least one timer integrated circuit of the timer subsystem responsive to the signal interface receiving the actuation signal.

28. A fire suppression arrangement comprising:

a fire suppressing gas generator as set forth in claim 1; and a frame physically retaining the fire suppressing gas generator.

29. The fire suppression arrangement of claim 28, wherein the frame comprises:

a base;

a plurality of upper arcuate supports dimensioned to receive and support an underside of the fire suppressing gas generator;

a plurality of lower arcuate supports dimensioned to receive and support a top side of the fire suppressing gas generator; and a plurality of pillars extending from and affixable to the base to retain the upper arcuate supports and the lower arcuate supports against the fire suppressing gas generator thereby to retain the fire suppressing gas generator within the frame.

30. The fire suppression arrangement of claim 29, further comprising a post at an end of each pillar distal from the base, and respective apertures on a side of the base opposite to the pillars.

31. A fire suppression system comprising:

a stack of multiple of the fire suppression arrangements of claim 29, wherein posts of fire suppression arrangements are inserted into apertures of adjacent fire suppression arrangements.

32. The fire suppressing gas generator of claim 1, wherein the fire suppression subsystem is hermetically sealed within an interior of the inner housing component.

33. The fire suppressing gas generator of claim 32, further comprising:

at least one inert test gas sealed within the inner housing component;

at least one normally closed valve extending from an exterior of the inner housing component to the interior of the inner housing component for, when caused to be opened, extracting a quantum of the inert test gas thereby to confirm the hermetic sealing of the fire suppression subsystem.

34. The fire suppressing gas generator of claim 2, further comprising:

a ring at each of opposite ends of the cylindrical inner housing component for centering respective ends of the cylindrical filter within the cylindrical inner housing component;

an end cap connectable to each of opposite ends of the cylindrical inner housing component for retaining the fire suppression subsystem within the cylindrical inner housing component; and a gasket within a respective ring at each of the opposite ends of the cylindrical inner housing component and between a respective end cap and the cylindrical filter, wherein prior to connecting of the end caps and the cylindrical inner housing component each gasket extends beyond the respective ring and is compressible between the respective end cap and the cylindrical filter.

35. A fire suppressing gas generator comprising:

a housing structure comprising an inner housing component having an array of discharge ports distributed thereon;

a fire suppression subsystem hermetically sealed within the inner housing component and comprising:

a filter disposed within the inner housing component and spaced from an interior wall of the inner housing component;

a plurality of propellant grains inside the filter, the plurality of propellant grains comprising at least one column of stacked propellant grains, each of the propellant grains comprising a pressed mixture of sodium azide and iron oxide; and at least one ignition device associated with the propellant grains, wherein the propellant grains when ignited by the ignition device generate a fire suppressing gas which passes through the filter and out of the discharge ports of the inner housing component; and at least one inert test gas sealed within the inner housing component;

and at least one normally closed valve extending from an exterior of the inner housing component to the interior of the inner housing component for, when caused to be opened, extracting a quantum of the inert test gas thereby to confirm the hermetic sealing of the fire suppression subsystem.

36. A fire suppressing gas generator comprising:

a housing structure comprising a cylindrical inner housing component having an array of discharge ports distributed thereon;

a fire suppression subsystem within the cylindrical inner housing component and comprising:

a cylindrical filter disposed within the inner housing component and spaced from an interior wall of the cylindrical inner housing component;

a plurality of propellant grains inside the filter, the plurality of propellant grains comprising at least one column of stacked propellant grains, each of the propellant grains comprising a pressed mixture of sodium azide and iron oxide; and at least one ignition device associated with the propellant grains, wherein the propellant grains when ignited by the ignition device generate a fire suppressing gas which passes through the filter and out of the discharge ports of the cylindrical inner housing component;

a ring at each of opposite ends of the cylindrical inner housing component for centering respective ends of the cylindrical filter within the cylindrical inner housing component;

an end cap connectable to each of opposite ends of the cylindrical inner housing component for retaining the fire suppression subsystem within the cylindrical inner housing component; and a gasket within a respective ring at each of the opposite ends of the cylindrical inner housing component and between a respective end cap and the cylindrical filter, wherein prior to connecting of the end caps and the cylindrical inner housing component each gasket extends beyond the respective ring and is compressible between the respective end cap and the cylindrical filter.

* * * * *